(12) United States Patent
Strater et al.

(10) Patent No.: US 11,895,551 B2
(45) Date of Patent: *Feb. 6, 2024

(54) WIRELESS STEERING CONTROLLER

(71) Applicant: ARRIS Enterprises LLC, Suwanee, GA (US)

(72) Inventors: Jay Strater, San Diego, CA (US); Gregory Nakanishi, San Diego, CA (US); Kurt Alan Lumbatis, Dacula, GA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,111

(22) Filed: Nov. 21, 2022

(65) Prior Publication Data

US 2023/0127459 A1 Apr. 27, 2023

Related U.S. Application Data

(63) Continuation of application No. 17/172,390, filed on Feb. 10, 2021, now Pat. No. 11,540,194, which is a
(Continued)

(51) Int. Cl.
*H04W 36/30* (2009.01)
*H04W 48/20* (2009.01)
(Continued)

(52) U.S. Cl.
CPC .......... *H04W 36/30* (2013.01); *H04B 17/318* (2015.01); *H04W 36/0058* (2018.08);
(Continued)

(58) Field of Classification Search
None
See application file for complete search history.

(56) References Cited

U.S. PATENT DOCUMENTS

| 8,660,497 B1 | 2/2014 | Zhang |
| 8,687,512 B2 | 4/2014 | Iyer |

(Continued)

FOREIGN PATENT DOCUMENTS

| WO | 2014/145073 | 9/2014 |
| WO | 2016/092121 | 6/2016 |

(Continued)

OTHER PUBLICATIONS

Office Action dated Dec. 14, 2020 in Canadian Patent Application No. 3,063,432.
(Continued)

*Primary Examiner* — Kevin D Mew
(74) *Attorney, Agent, or Firm* — Wenderoth, Lind & Ponack, L.L.P.

(57) ABSTRACT

A controller for steering a client device between content streaming apparatuses in a wireless local area network (WLAN). The controller is configured to determine whether a client device should be steered to a content streaming apparatus based on at least one sample measurement related to the client device and/or the content streaming apparatus. The steering logic calculations may use predetermined thresholds.

18 Claims, 31 Drawing Sheets

Related U.S. Application Data continuation of application No. 15/982,552, filed on May 17, 2018, now Pat. No. 10,959,148.

(60) Provisional application No. 62/507,751, filed on May 17, 2017.

(51) Int. Cl.
  *H04B 17/318* (2015.01)
  *H04W 36/00* (2009.01)
  *H04W 36/08* (2009.01)
  *H04W 84/12* (2009.01)

(52) U.S. Cl.
  CPC ....... *H04W 36/0085* (2018.08); *H04W 36/08* (2013.01); *H04W 48/20* (2013.01); *H04W 84/12* (2013.01)

(56) References Cited

U.S. PATENT DOCUMENTS

| | | |
|---|---|---|
| 8,699,418 B2 | 4/2014 | Iyer et al. |
| 8,750,896 B2 | 6/2014 | Brisebois |
| 9,001,682 B2 | 4/2015 | Kovvali |
| 9,137,727 B2 | 9/2015 | Kulkarni |
| 9,144,020 B2 | 9/2015 | Clevorn |
| 9,252,991 B2 | 2/2016 | Zhang |
| 9,319,890 B2 | 4/2016 | Brisebois |
| 9,572,087 B2 | 2/2017 | Nagasaka |
| 9,788,250 B2 | 10/2017 | Nagasaka |
| 9,876,691 B2 | 1/2018 | Strater |
| 9,913,193 B2 | 3/2018 | Ho |
| 10,080,175 B1 | 9/2018 | Migaldi |
| 10,230,622 B2 | 3/2019 | Cui |
| 10,313,915 B2 | 6/2019 | Lee |
| 10,334,496 B2 | 6/2019 | Teyeb |
| 10,588,063 B2 | 3/2020 | Henderson |
| 10,959,148 B2 | 3/2021 | Strater |
| 11,140,457 B1 * | 10/2021 | Jordan ............ H04N 21/64707 |
| 11,297,125 B2 | 4/2022 | Strater |
| 2011/0235591 A1 | 9/2011 | Iyer et al. |
| 2012/0275320 A1 | 11/2012 | Iyer |
| 2013/0095846 A1 | 4/2013 | Brisebois et al. |
| 2013/0259005 A1 | 10/2013 | Kulkarni |
| 2014/0059218 A1 | 2/2014 | Ganu et al. |
| 2016/0007278 A1 | 1/2016 | Gupta et al. |
| 2016/0119819 A1 | 4/2016 | Ardeli et al. |
| 2016/0249267 A1 | 8/2016 | Ho et al. |
| 2016/0277956 A1 | 9/2016 | Lindheimer et al. |
| 2018/0176284 A1 | 6/2018 | Strater et al. |
| 2018/0284758 A1 * | 10/2018 | Cella ................. G05B 23/0283 |
| 2018/0324655 A1 | 11/2018 | Comstock |
| 2019/0041842 A1 * | 2/2019 | Cella ...................... H04W 4/80 |
| 2019/0158383 A1 | 5/2019 | Cui |

FOREIGN PATENT DOCUMENTS

| | | | |
|---|---|---|---|
| WO | 2017/004570 | 1/2017 | |
| WO | WO-2017004570 A1 * | 1/2017 | .......... H04B 17/318 |
| WO | WO-2018213646 A1 * | 11/2018 | .......... H04B 17/318 |

OTHER PUBLICATIONS

Office Action dated Nov. 19, 2020 in European Patent Application No. 18 732 522.0.

PCT Invitation to Pay Additional Fees (Form ISA/206), RE: Application No. PCT/U82018/033283, dated Aug. 28, 2018.

PCT International Search Report & Written Opinion, RE: Application No. PCT/US2018/033283, dated Oct. 24, 2018.

Office Action dated Sep. 2, 2021 in Canadian Patent Application No. 3,063,432.

Office Action dated Nov. 2, 2021 issued in European Application No. 18 732 522.0.

* cited by examiner

| DEVICE | AP | CHANNEL UTILIZATION | ASSOCIATED CLIENT COUNT | CANDIDATE STA LINK QUALITY | SUPPORTED CHANNEL CORRELATION | CHANNEL COVERAGE MISMATCH |
|---|---|---|---|---|---|---|
| RG | AP1 (5GHz) | 49% | 10 | | YES | YES |
| | AP2 (2.4GHz) | 30% | 5 | 2.1 | YES | NO |
| HNE1 | AP1 (5GHz) | 78% | 6 | | NO | NO |
| | AP2 (2.4GHz) | 36% | 4 | | YES | NO |
| HNE2 | AP1 (5GHz) | 41% | 3 | | YES | NO |
| | AP2 (2.4GHz) | 61% | 5 | | YES | NO |
| HNE3 | AP1 (5GHz) | 35% | 6 | | YES | NO |
| | AP2 (2.4GHz) | 36% | 4 | | YES | NO |

FIG. 13A

| CANDIDATE STA CAPABILITY | SUPPORTED CHANNEL CORRELATION | RG/HNE LINK TYPE | LINK PROTOCOL/ CHARACTERISTIC | AP FOR WIRELESS LINK | HNE/RG LINK SUPPORTED PHY RATE (Mbps) | HNE/RG LINK UTILIZATION |
|---|---|---|---|---|---|---|
| VHT | YES | NA | NA | NA | NA | NA |
| VHT | YES | " | " | " | " | " |
| VHT | NO | WIRELESS | SHARED WIFI RADIO | AP1 | 500 | 80% |
| VHT | YES | " | " | NA | " | " |
| VHT | YES | WIRED | G.hn | NA | 900 | 55% |
| VHT | YES | " | " | " | " | " |
| VHT | YES | WIRELESS | DEDICATED WIFI RADIO | NA | 600 | 67% |
| VHT | YES | " | " | " | " | " |

FIG. 13B

| DEVICE | AP | CHANNEL UTILIZATION | ASSOCIATED CLIENT COUNT | SUPPORTED CHANNEL CORRELATION | RG/HNE LINK TYPE |
|---|---|---|---|---|---|
| RG | AP1 (5GHz) | 49% | 10 | YES | NA |
|  | AP2 (2.4GHz) | 30% | 5 | YES | " |
| HNE1 | AP1 (5GHz) | 76% | 6 | NO | WIRELESS |
|  | AP2 (2.4GHz) | 36% | 4 | YES |  |
| HNE2 | AP1 (5GHz) | 41% | 3 | YES | WIRED |
|  | AP2 (2.4GHz) | 61% | 5 | YES | " |
| HNE3 | AP1 (5GHz) | 35% | 6 | YES | WIRELESS |
|  | AP2 (2.4GHz) | 38% | 4 | YES | " |

FIG. 16A

| LINK PROTOCOL/ CHARACTERISTIC | AP FOR WIRELESS LINK | HNE/ RG LINK SUPPORTED PHY RATE (Mbps) | HNE/ RG LINK UTILIZATION |
|---|---|---|---|
| NA | NA | NA | NA |
| " | " | " | " |
| SHARED WIFI RADIO | AP1 | 500 SHARED | 80% |
| | NA | | |
| G.hn | NA | 900 | 56% |
| " | " | " | " |
| DEDICATED WIFI RADIO | NA | 600 | 67% |
| " | " | " | " |

FIG. 16B

| STA STATUS | | | STATE OF STEERING DETERMINATION* | STA LIST OUTCOME |
|---|---|---|---|---|
| CURRENT BAND | STATE OF BAND SUPPORT DETERMINATION* | STATE OF DUAL CAPABILITY* | | PUT STA IN LIST (YES OR NO) |
| 5GHz | 5G | UNDETERMINED | 2G AND 5G STEERING UNFRIENDLY | NO |
| | | | 2G STEERING UNFRIENDLY | YES (NEED TO SCREEN OUT 2G IN CANDIDATE AP DETERMINATION |
| | | | 5G STEERING UNFRIENDLY | YES IF OPTION 1 TO STEER TO 2G WHEN UNDETERMINED, AND NEED TO BE SCREEN OUT 5G IN CANDIDATE AP DETERMINATION<br><br>NO OTHERWISE |
| | 2G + 5G | NO | 2G AND 5G STEERING UNFRIENDLY | NO |
| | | | 2G STEERING UNFRIENDLY | NO (HOWEVER THIS IS AN NA CASE) |
| | | | 5G STEERING UNFRIENDLY | NO |
| | | YES | 2G AND 5G STEERING UNFRIENDLY | NO |
| | | | 2G STEERING UNFRIENDLY | YES (TO BE SCREEN OUT 2G IN CANDIDATE AP DETERMINATION |
| | | | 5G STEERING UNFRIENDLY | YES (TO BE SCREEN OUT 5G IN CANDIDATE AP DETERMINATION |

FIG. 19A

| 2.4GHz | | | | |
|---|---|---|---|---|
| | 2G | UNDETERMINED | 2G AND 5G STEERING UNFRIENDLY | NO |
| | | | 2G STEERING UNFRIENDLY | YES IF OPTION 1 TO STEER TO 5G WHEN UNDETERMINED, AND NEED TO BE SCREEN OUT 2G IN CANDIDATE AP DETERMINATION NO OTHERWISE |
| | | | 5G STEERING UNFRIENDLY | YES (TO BE SCREEN OUT 5G IN CANDIDATE AP DETERMINATION |
| | | NO | 2G AND 5G STEERING UNFRIENDLY | NO |
| | | | 2G STEERING UNFRIENDLY | NO |
| | | | 5G STEERING UNFRIENDLY | NO (HOWEVER THIS IS AN NA CASE) |
| | 2G + 5G | YES | 2G AND 5G STEERING UNFRIENDLY | NO |
| | | | 2G STEERING UNFRIENDLY | YES (TO BE SCREEN OUT 2G IN CANDIDATE AP DETERMINATION |
| | | | 5G STEERING UNFRIENDLY | YES (TO BE SCREEN OUT 5G IN CANDIDATE AP DETERMINATION |

FIG. 19B

WIRELESS STEERING CONTROLLER

FIELD

The present disclosure relates to systems and methods that steer content between streaming devices within wireless communication networks; and, more particularly, to wireless network systems that include a wireless gateway, one or more content streaming apparatuses such as wireless extenders, one or more client devices (STAs) such as laptops, smart phones, etc., and a steering controller that determines signal strength associated with content streamed between the client devices and the gateway/extenders, and steers client devices to the content streaming device having improved wireless connectivity performance.

BACKGROUND

Repeaters or extenders are commonly utilized to extend the coverage area of Wi-Fi or wireless networks. Generally, extenders (or repeaters) operate by receiving and amplifying existing Wi-Fi signals from an access point (AP) within the extender and transmitting the boosted or amplified signal to a receiver within a digital device, such as an STA, gateway, etc. The coverage area of a given Wi-Fi network can be effectively doubled with the use of a Wi-Fi repeater or extender, extending the Wi-Fi connectivity to far corners of a home or office, different floors, or even to outside proximal locations. Though wireless extenders are added to Wi-Fi networks to improve the Wi-Fi coverage of a gateway, Wi-Fi client's STAs do not easily re-associate with a new access point. Instead, the STAs tend to remain associated with one AP (in the gateway or an extender) when a closer AP with stronger Wi-Fi link is available. This issue is known as the "sticky client" problem; the mobile devices fail to roam to the best AP because the Wi-Fi airtime is shared among all the devices connected to the wireless LAN (WLAN).

"AP steering" moves a client (STA) "stuck" to one AP with a poor signal quality, indicated by a low received signal strength indicator (RSSI), to another AP with a better signal strength. While air-time fairness logic provided by chipset vendors mitigates one client "hogging" airtime from others, the client is better off being moved to another AP. Various steering solutions involve "AP steering" of a client conducted by a controller in, e.g. a gateway, to disassociate a client from an existing AP if it has a weak link and force it to find another AP with a strong link. The steering is typically not managed by a network controller, and the chips in the AP do not communicate received signal strength indicator (RSSI) information to the network controller. As a result, these steering solutions fail to provide additional logic criteria in determining whether to move the client.

"Band steering", on the other hand, optimizes channel utilization in a given AP to avoid overloading one band over another band by enabling dual-band wireless clients to connect to less crowded 5 GHz network, leaving the 2.4 GHz network available for those clients who support 2.4 GHz only. Accordingly, Wi-Fi performance can be improved for all clients. When a Wi-Fi environment offers connectivity in both 2.4 GHz and 5 GHz, and clients have both 2.4 GHz and 5 GHz capability, band-steering techniques therefore need to define an optimal or target balance of the load between the two frequency bands.

As just noted, WiFi client band steering is typically driven by the need to make a more efficient balance of 2.4 GHz and 5 GHz channel utilization as triggered when an AP shows high utilization. This includes trying to get more advanced clients with 802.11ac (VHT) on 5 GHz and those with only 802.11n (HT) on 2.4 GHz. Conversely, WiFi client AP steering is typically driven by the need to move a client with poor link quality that is "stuck" on a given AP to another AP with better link quality. This need exists because client logic is often resistant to changing AP/channel on its own. Thus, while dynamic ("smart") channel selection may be implemented from a chipset vendor to shift a signal between bands on a given device; dynamic channel selection does account for AP steering based on signal strength, nor does dynamic correction provide additional logic criteria to determine whether to move a client STA to another device entirely. The converse is also true; device logic for AP steering based on signal strength does not account for channel utilization on the particular bands that a client STA is switched to.

The separate controller logic or band and AP steering of WiFi clients can result in inefficient/cross purpose operations. An example is a client being steered to another band of the same extender or other device, when steering to another device entirely would have been preferable. Another example is a client being steered to a new device on the same band, when another band in the new device would have been preferable.

Another issue that that logic for RG client steering can be overly simplistic, focused simply on channel utilization or client link quality. Finally an issue is that 802.11 blacklisting is often used exclusively for executing client steering. Instead 802.11 BSS transition management (BTM) should be the favored over blacklisting when proactively executing client steering if both AP and client are found to support BTM.

SUMMARY

In a first embodiment, a wireless steering controller may be configured to steer a client device from a first content streaming apparatus to a second content streaming apparatus using a comparison of measurements from the first and second content streaming apparatuses to at least one threshold.

In a second embodiment, a method for steering a client device in a wireless network from a first content streaming apparatus to a second content streaming apparatus, may include receiving a first measurement and comparing it to a first threshold while the client device is connected to the first content streaming apparatus, receiving a second measurement and comparing it to a second threshold; and steering the client device to the second content streaming apparatus based on at least one of the first threshold and the second threshold.

In a third embodiment, a wireless steering controller may be configured to select one of a plurality of client device associated with a first content streaming apparatus and steer the selected client device to a second content streaming apparatus, selected by the controller from a plurality of content streaming apparatuses. The wireless controller may select the client device using a measurement comprising at least one of a signal strength measure and a capacity measure. The wireless controller may select the second content streaming apparatus using the other one of the signal strength measure and the capacity measure.

BRIEF DESCRIPTION OF THE DRAWINGS

The invention will be more fully understood and further advantages will become apparent when reference is had to the following detailed description of the preferred embodiments of the invention and the accompanying drawing, in which:

FIGS. 13A and 13B show an example Network table outcome for the embodiment illustrated by FIG. 12.

FIGS. 16A and 16B show an example tabular summary of AP/STA characteristics used to implement steering.

FIGS. 19A and 19B show exemplary STA List screening criteria

DETAILED DESCRIPTION

Figure 1:
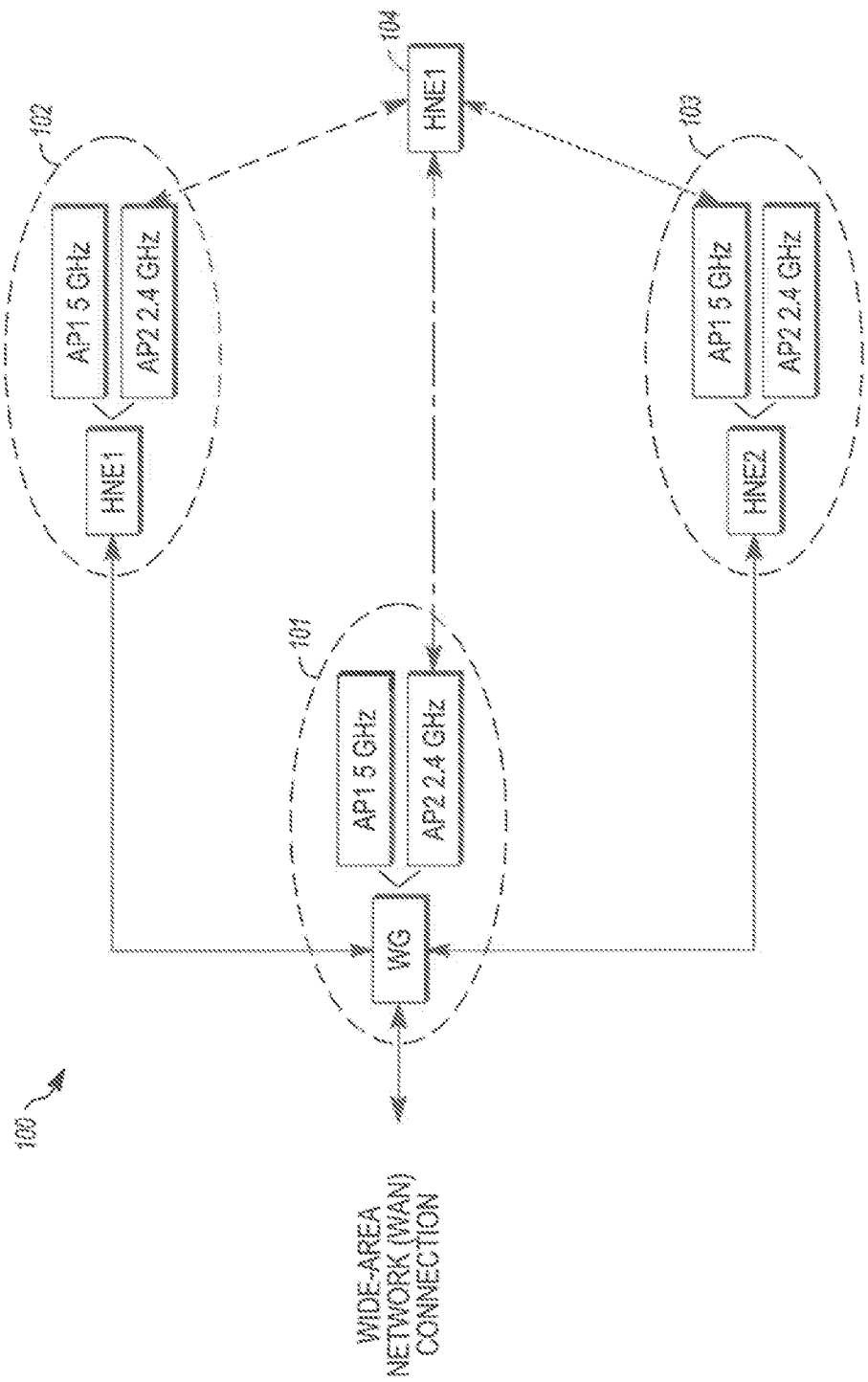
FIG. 1 shows a residential wireless gateway (GW) with Home Network Extenders (HNE), both having a plurality of access points (APs). A client stations (STA) is shown with different link quality connections to the AP.

Aspects of this disclosure relate to a wireless gateway having a gateway steering controller for steering between content streaming apparatuses by executing steering logic determined by signal strength between a client device and a given content streaming apparatus. An "access point" as used in this specification broadly refers to chipsets or circuitry that receive and/or transmit wireless data in a wireless network on a given frequency band. Thus, for example, a gateway or extender may be configured with dual access points; one on a 2.4 GHz band and one on a 5 GHz band. Other devices may be configured with a single access point on a 2.4 GHz. band.

Though this specification will describe multi-band access points using exemplary dual-band technology where devices are configured with both a 2.4 Ghz band and a 5 Ghz band, those of ordinary skill in the art will realize that the frequency ranges of these bands are exemplary only and that the embodiments described herein may be extended to different bands, and may be extended to devices allowing wireless transmission on any desired number of bands, e.g. three bands, four bands etc.

Content streaming apparatuses, as used in this specification may include gateway access points (GW APs), extender access points (APs), and other wireless network devices that relay content from one point in a wireless network to another point in the wireless network. A client device, as used in this specification, refers to a device communicating via the 802.11 protocol (Wi-Fi) wireless network including, without limitation, a computer, laptop or smartphone. Generally, the wireless gateway is a wireless gateway access point (GW or GW AP) configured with the gateway controller capable of determining signal strength of streaming sessions on all of the gateway devices. Using this information, the gateway controller is configured to conduct steering logic calculations and compare the calculations against predetermined thresholds.

The gateway device disclosed herein is preferably a GW AP configured as, and can be designated as, a streaming manager or gateway steering controller, within a network. The gateway steering controller is configured to instruct associated STA's or extender APs to initiate client steering controls that determine signal strength of each AP with each client device or STA. Using this information, the gateway steering controller performs steering logic and transfers streaming sessions from one AP to another AP. The gateway steering controller can be implemented by a Gateway Streaming Manager (GSM) in one of plural content streaming apparatuses in the wireless network. Those of skill in the art will appreciate that any suitable wireless transmission protocol may be used, such as WiFi (IEEE 802.11), Bluetooth, 3GPP and 4G LTE, in the wireless network.

A content streaming apparatus as disclosed herein preferably includes an input for receiving an input signal, a wireless controller configured to communicate wirelessly with a client device and receive from the client device a streaming session request for streaming of requested content, and a plurality of tuners, each of which is configured to selectively tune to a. portion of the input signal. The content streaming apparatus also includes a tuner controller configured to select an unused one of the tuners, and tune the selected tuner to receive the requested content from the input signal, and a controller configured to establish a streaming session with the client device via the wireless controller and send the requested content to the client device in the streaming session. The content streaming apparatus also include network connection circuitry, such as an Ethernet controller and Ethernet PHY, and/or a MoCA controller and MoCA PHY.

In one embodiment, the content streaming apparatus may include a gateway steering controller configured to determine whether a client device should be steered to a content streaming apparatus based on at least one sample measurement on received signal strength between the client device and the content streaming apparatus and at least one other content streaming apparatus. The gateway steering controller may preferably conduct steering logic calculations. The steering logic calculations may be compared against predetermined thresholds. The gateway steering controller may provide an instruction to steer the client device to one of the content streaming apparatus based on a difference between the steering logic calculations and the predetermined thresholds.

Content streaming apparatuses may include access points (APs), network extenders containing access points (AP), repeaters, and other contemplated content streaming apparatus having wireless capabilities. Wi-Fi performance of client stations (STAs) connected to an AP are monitored by gateway firmware through a received signal strength indicator (RSSI) of current STA to AP association. Clients having a poor (low RSSI) AP or STA association are steered to a different AP that has adequate throughput capacity, thereby improving wireless connectivity performance.

The present disclosure may in some embodiment be implemented via a wireless gateway (GW) in a residential environment that is capable of communicating with a plurality of content streaming apparatuses, including access points (AP). Each AP preferably includes at least dual frequency bands for receipt and transmission of client STA signals, e.g. 2.4 and 5 GHz bands. Signal strength of all communicable devices (client devices) are communicated by each AP to the GW. While embodiments are discussed in reference to residential environments, it is noted that further embodiments may have applications outside of residential environments as well, such as commercial environments, public environments, etc.

A gateway wireless access point (e.g. an access point in a wireless gateway) may be connected to at least one other content streaming apparatus, such as wireless APs in either the GW or in Home Network Extenders (HNEs). In some embodiments, the GW may preferably be configured with a GW controller that performs steering functions. Those of ordinary skill in the art will appreciate that other wireless devices, such as extenders, may include the controller functionality described in this specification. The APs communicate respective signal strengths of all communicable devices, or client devices, linked or associated with the GW. Initially an STA communicates with a plurality of content streaming apparatuses or APs, selects an AP with a good signaling connection (relatively low negative dBm value) and establishes communication with the selected AP.

A common Service Set Identifier (SSID) and passphrase (associated phrase-shifting key (PSK)) may preferably be used in the GW's internal APs, and in any HNE's APs for STA association. Once associated with its initially chosen AP, the client STA typically stays connected to the AP during internet or Web communications, unless it is steered to a different AP by the controller. All APs transmit STA RSSI data as available to the GW. The controller looks for STAs with low RSSI levels to determine when to steer a STA, addressing the "sticky client" problem. Additionally, a number of client's STA may connect to the same AP thereby overloading the communication capability of an access point. This issue can be addressed by steering for channel utilization or via band steering. Controller logic, in some embodiments, further avoids steering an STA with poor signal quality (low RSSI) to an AP with high channel utilization to avoid channel overloading that AP when addressing the "sticky client" issue.

The APs preferably have the capability to measure the signal strength of received STA data. RSSI is a term used to measure the relative quality of a received signal from a client device, but has no absolute value. IEEE 802.11 standards specify that RSSI can be quantified on a scale of 0 to 255, and that generally manufacturers can define their own "RSSI Max" value. Cisco, for example, uses a 0-100 scale, while Atheros uses 0-60. Though relative RSSI scales are configurable by a given manufacturer, it is typically inferred that the higher the RSSI value, the better the signal.

Since RSSI varies greatly between manufacturers, software generally uses a more standardized, absolute measure of signal strength—received signal power measured in decibels (dBm) on a logarithmic scale; the closer to 0 dBm, the better the signal. The units of dBm and RSSI are different measurement units that both represent the same thing, i.e. signal strength. The difference between these two measurements is that the RSSI numeric value is a relative index, while dBm is an absolute number representing power levels in dBmW (milliwatts).

When an STA's associated RSSI link to a particular AP is lower than a configurable value or threshold (e.g. −75 dBm), the GW controller may target that STA to be steered. To support which AP to steer a client to a network's link, a metric Table is used, as exemplified in metric Table 1, shown below.

TABLE 1

| | | AP steering logic | | |
| --- | --- | --- | --- | --- |
| Band | Measurement Status | Link Metric GW | HNE1 | HNE2 |
| AP1 with 5 GHz | Estimated RSSI (Missing measurement) | −78 dBm | −60 dBm | −66 dBm |
| AP2 with 2.4 GHz | Measured RSSI | −73 dBm | −65 dBm | −61 dBm |

The network's link metric Table I indicates the link RSSI quality of an STA relative to the network APs, where the APs are operating on 2.4 or 5 GHz bands. An STA will have an association with only one AP in the network, which could be in the GW or in an HNE. The RSSI for STAs from non-associated AP(s) in the same band may also be available. STAs typically only operate in one band at a time, so any RSSI from an STA to an AP in the other band will not typically be available. Consequently, the Link metrics table includes an estimation of the STA's RSSI to APs in the other band when this information is not available.

When STA RSSI measurement in the other band is not available, an estimated link metric can be inferred to be equal to the measured RSSI from the other band (in dBm) plus a Band Weighting. This applies to the AP in the other band for a given device (GW, HNE1, HNE2, etc.), since the link metric can only be estimated relative the measured band in a given device. The Band Weighting is a configurable estimate. In the example shown in Table 1, it is assumed that a Band Weighting of +5 dBm is needed to estimate RSSI for 2.4 GHz links if STA link measurements are only available at 5 GHz. A positive weighting to 2.4 GHz is used since 5 GHz signal strength is typically lower than that of 2.4 GHz. The opposite would apply if the STA information were available at 2.4 GHz, but missing at 5 GHz, i.e. the assumed band weighting may preferably be a negative weighting such as −5 dBm. The controller uses the network link metric table to determine which AP to steer a target STA to. It does this by eliminating those APs with measured and estimated links with RSSI below an acceptable quality threshold (e.g. −65 dBm) to the target STA. The RSSI link threshold is preferably a configurable setting. Using the example values in Table I and example threshold of −65 dBm, only HNE1 AP1, HNE1 AP2 and, HNE2 AP2 are remaining AP candidates for steering the target STA to.

As shown in Table 2 below, an AP Band Option Table may be included as an enhancement the AP steering logic presented in Table I, to further refine AP steering decisions. In Table II, AP steering logic uses channel utilization measurements to avoid steering a STA into an overly utilized AP, when it can be avoided.

TABLE 2

AP steering logic

| Band | Measured Utilization GW | HNE1 | HNE2 |
|---|---|---|---|
| AP1 with 5 GHz | 55% | 68% | 89% |
| AP2 with 2.4 GHz | 73% | 82% | 59% |

When the band utilization for a particular AP is greater than an acceptable value (e.g. 75%), the controller will eliminate that AP as a candidate for AP steering of the STA. The channel utilization threshold is a configurable setting. Using the example above in the table and example threshold 75%, HNE2 AP1 is eliminated as an AP candidate for steering the target STA to.

When a non-associated AP is detected, its RSSI is not readily available and has to be estimated in a Link-metrics table. The RSSI estimation process includes measured RSSI from other band+Band Weighing (described previously). The wireless gateway controller performs the operation of steering the connected sticky STA (target STA) connected to its current AP to another AP with good link quality (adequately low RSSI) and which is not overloaded (adequately low channel utilization).

When the residence is large, and one or more HNE APs are required, HNE AP extenders may be connected to the GW by wired connection or wireless connection. Wired extenders use G.hn, MoCA, or other dedicated network path(s) with the GW. The wireless connection between an STA and the AP extenders is similar to that described earlier.

In some embodiments, the wireless AP steering solution may comprise a residential wireless network having a wireless gateway (GW) controller capable of communicating with a plurality of wireless access points, APs (in the GW and in HNEs), each having chipsets for communication with wireless client devices (STAs). Each HNE may have either wired or wireless links to the residential gateway. Each of the APs preferably have a chipset for communication with the STA at frequencies of 2.4 GHz and 5 GHz. A client station STA having a modem with a chip set operating at 2.4 GHz, or 5 GHz, or both (although typically not concurrently), initially selects the AP with the highest signal value or lowest dBm negative value. A common Service Set Identifier (SSID) and passphrase (associated PSK) are used in the GW's internal APs and HNE's APs to simplify STA association. All the associated APs communicating to the wireless gateway controller preferably report a received STA signal strength indication value, RSSI, where a high negative value of RSSI of below a configurable value (e.g. −75 dBm) indicates a sufficiently weak connection that the STA should be steered to another AP.

The gateway controller, upon recognizing a low signal strength for a STA, preferably steers that STA from its currently associated AP to another AP with better link quality (RSSI value). The target STA's RSSI link quality measurements at one band, as noted earlier, may be used to estimate missing RSSI link quality on another band if necessary so as to create a complete AP link metric table for the target STA, by preferably applying a configurable positive weighting factor offset when estimating the target STA's 2.4 GHz RSSI link quality from 5 GHz link measurements, and applying a configurable negative weighting factor offset when estimating the target STA's 5 GHz RSSI link quality from 2.4 GHz RSSI link measurements. In some preferred embodiments, the gateway controller uses the AP link metric table to determine which AP to steer a target STA to, by eliminating APs with measured and/or estimated links with an RSSI below a configurable, acceptable quality threshold (e.g. −65 dBm). Additionally the use of AP channel utilization, using an AP channel utilization table, preferably avoids steering an STA to an overly-utilized AP by further eliminating APs with channel utilizations over a configurable, acceptable value (e.g. 75%). In this manner, the gateway controller steers the target STA to an AP it finds acceptable, and disassociating it from its current associated AP, after screening potential APs for acceptable RSSI link quality and channel utilization by blacklisting APs not found to have acceptable metrics. (including its current associated AP).

A client station STA preferably communicates with a plurality of communicable APs to obtain their received signal strength indication (RSSI) in dBm units, selecting an AP with lowest negative dBm value or highest signal strength to establish communication with the selected AP. The client provides a Service Set Identifier (SSID) and passphrase (associated PSK) to authenticate connection to the wireless gateway. Once connected, the client STA stays connected to the access point which further connects to the wireless gateway GW during internet or Web communications unless the STA is steered to a different AP by the wireless controller. That is to say, each client station (STA) connects to a single AP providing Service Set Identifier (SSID) and passphrase (associated PSK) to authenticate connection to the wireless gateway. When the AP that the client is connected to becomes overloaded, the Wi-Fi connectivity becomes very slow and is known in the industry "sticky client" problem.

Specifically, the selected AP transmits to the wireless gateway the RSSI data of all communicable access points for the client station STA. The AP provided RSSI list is also available to the wireless gateway, which corroborates the STA provided RSSI with that provided by the AP. The client STA also has a chip set for communication at 2.4 GHz, at 5 GHz, or chips for both frequencies. If a client STA has only a 2.4 GHz chip set, it can only communicate at 2.4 GHz with the connected AP and cannot be steered to an AP for communication at 5 GHz. A number of client STAs may connect to the same access point AP that is used by the client, thereby overloading the communication capability of the access point. This progressively reduces the communication rate, creates a "sticky client" problem. The wireless gateway controller managing the AP steering and band steering requires scanning of all APs and STAs.

This "sticky client" problem may be addressed by seamlessly steering the AP connection of the client station STA to a less-loaded AP, or steer the communication band to a higher frequency such s 5 GHz so that data can flow at a higher rate. In this embodiment, this band steering is managed by a wireless gateway controller, although those of ordinary skill in the art will recognize that the controller may be located in other network devices.

The GW controller preferably utilizes information gathered from all APs (wireless extender APs, wired extender APs, repeaters and/or the GW's own AP). Such information preferably includes any or all of: (i) associated STA RSSI measurements; (ii) associated STA traffic level measurements; (ii) non-associated STA RSSI measurements (if available via Wi-Fi chipset API in APs); (iv) band of operation for prior STA information; (v) AP channel utilization measurements (if needed per configuration setting); and (vi) information retained by the controller for all STAs it has attempted to steer to another AP, successfully or unsuccessfully, including the length of time that an STA was last steered to another AP, the last AP an STA was steered to, and STA steering statistics, which preferably include prior data.

The controller configuration settings for AP steering preferably include: (i) feature selection (enable or disable); (ii) threshold settings; (iii) band weighting values; (iv) an APs capability for providing non-associated STA RSSI (yes or no); (v) an option for AP steering if prior capability is not provided (yes or no); and (vi) an option for using channel utilization restrictions in AP steering (yes or no).

To facilitate band steering in accordance with the disclosure herein, an AP preferably collects information from its wireless interfaces (in both bands), including one or all of: (i) AP channel utilization measurements; (ii) associated STA RSSI measurements; (iii) associated STA Wi-Fi capability (i.e. HT, VHT); (iv) associated STA traffic level measurements; (v) band of operation for prior STA information; (vi) AP configuration settings for band steering; (vii) Feature selection (enable or disable); (vii) Feature Threshold settings and (ix) information retained for all STAs that have been band steered to or from the AP, successfully or unsuccessfully, including the length of time that an STA was last steered to another AP, the last AP an STA was steered to, STA steering statistics, which preferably include prior data.

The residential wireless gateway steering system may comprise a wireless gateway (GW) with a plurality of connected points (AP), each connecting to one or more client stations STA and each STA having a chip set communicating at 2.4 GHz or 5 GHz or both frequencies with all neighborhood APs to acquire their received strength indication RSSI and create an ordered list from the lowest RSSI. This ordered list may be used to initiate a Basic Service Set (BSS) transition management frame request according to an IEEE 802.11v specification and verifying whether the STA is connected to an AP other band interface, and band steering the STA to a different band of 5 GHz from 2.4 GHz, whereby faster BSS transition is accomplished without the help of a wireless gateway monitor and without actively scanning RSSI values of all APs and STAs.

In some embodiments of the disclosed systems and methods, AP steering is provided to move a client (STA) "stuck" with a bad connection (low RSSI) on one AP to another AP with better connection. Those of ordinary skill in the art will appreciate that air-time fairness logic provided by chipset vendors mitigates one client "hogging" airtime from others but this client is better off being moved. Band steering is also provided to optimize channel utilization in a given AP to avoid overloading one band over other band. Dynamic ("smart") channel selection may be employed from a chipset vendor in coexistence with the band steering.

A residential network may preferably include a wireless gateway (GW) and associated wireless extenders, which may use G.hn, MoCA or other dedicated network path(s) with the gateway AP. As such they can have different AP Wi-Fi channel(s) for their stations (STA), to maximize Wi-Fi network utilization. Residential networks may also have wireless repeaters that use one Wi-Fi radio per band to communicate with STA and with AP. As such they and the GW AP require a shared Wi-Fi channel and associated channel change coordination with the GW AP. Outside of channel coordination, wireless repeaters have the same steering consideration as wireless extenders.

The GW AP and wireless extender APs in a residence preferably share the same SSID and WPA2 passphrase (PSK). WPA2 Enterprise is preferably not utilized, avoiding use of 802.1x protocol with an authentication server. As such Fast BSS transition (802.11r) which conducts Pre-authentication (section 11.5.9.2 of IEEE 802.11 2012 standard) using 802.1x for PMK SA distribution to APs may not supported in some embodiments. However, such support may be provided if needed. WPA-Personal may be utilized in which PMK SA is cached (section 11.5.9.3 of IEEE 802.11 2012 standard) after initial STA association with an AP. This approach has been found simpler than Fast BSS, but has the disadvantage of imposing a delay in deriving PMK at initial authentication/association with each AP. However, once a STA associates with a given AP, it will experience the same short delay result as for Fast BSS with 4-way handshake using PMK to establish PTK.

In some embodiments, the GW AP preferably contains an AP steering controller, and wireless extenders contain an AP steering client. Having a controller in GW simplifies network architecture, though those of ordinary skill in the art will appreciate that the controller may be located in another network device, may be provided as a standalone device, or control could be distributed throughout the network, perhaps if greater robustness is needed. Thus, band steering need not utilize a central GW controller. Instead each AP (GW and wireless extenders) can have their own band steering logic. Steering logic requires averaging several sample measurements (in configurable sliding window). Averaging is needed to provide a more reliable measurement and prevent spurious activations. Preferably, steering logic commences following the establishment of a security communications link between the GW and wireless extenders. The GW may establish secure connections with wireless extenders via IEEE1905.1a secure setup (e.g. for G.hn or MoCA link). Software Home Network Controller (HNC) logic may be used for app layer discovery, configuration, stats collection, and steering control.

GW AP and wireless extender APs in a residence preferably share the same SSID and WPA2 passphrase (PSK). WPA-Personal is utilized preferably utilized. Clients (STA) preferably support single or dual band Wi-Fi. Wireless set-top boxed (STBs) are typically 5 GHz single band. Mobile devices are typically dual band with 2.4 GHz and 5 GHz, with non-concurrent radio operation. The GW and wireless extender APs are preferably dual band with 2.4 GHz and 5 GHz, with concurrent radio operation. Multiple 5 GHz radios are a special case which is not addressed in the band-steering, but could if needed. In embodiments, tuning for AP and band steering thresholds will be necessary and include default parameters as useful placeholders.

FIG. 1 shows an exemplary wireless gateway network 100. A wide area network connects to a gateway 101 that has two associated access points AP1 and AP2 operating at 5 GHz and 2.4 GHz. WG 101 is wirelessly connected to home network extender (HNE1) 102 that also has two associated access points AP1 5 GHz and AP2 2.4 GHz. Additionally, WG 101 is connected to home network extender (HNE2) 103 through wired GW/HNE link, such as Ethernet, G.hn-PLC, and/or MoCA WiFi, and which has two associated access points AP1 5 GHz and AP2 2.4 GHz. STA1 104 is currently associated with AP2 of WG 101. If the signal strength or integrity between AP2 of WG 101 is poor, steering action is preferably triggered. Poor signal strength may be set or determined by threshold parameters, which may be preferably configurable. Signal strength is preferably determined as between STA1 104 and each of HNE1 102, HNE2 103 and WG 101. HNE1 102 and HNE2 103 provide alternate links with non-associated link quality measurement. For example, when the connection between AP2 of GW 101 and the STA1 104 is poor, STA1 104 terminates streaming with AP2 of GW 101 and may be connected to HNE1 102 AP2, which is the same operating frequency of 2.4 GHz. Alternatively the STA1 104 may be connected to HNE2 103 AP2 operating at 2.4 GHz. Both HNE1 102 and HNE2 103 are non-associated links to the gateway GW.

Figure 2A:
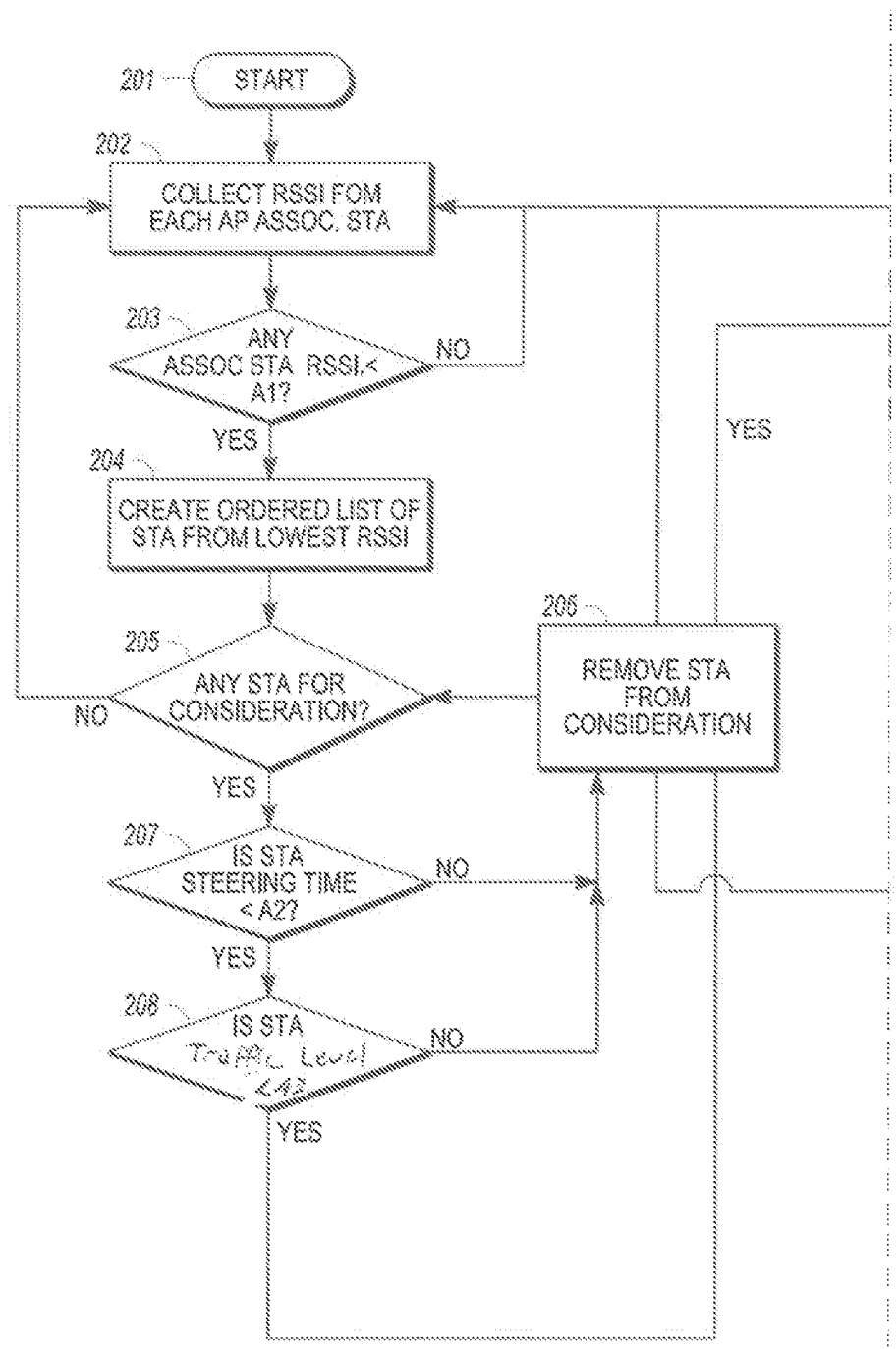
FIGS. 2A and 2B show an illustrative sequence of steps for AP steering of a client STA from one AP to another AP.
Figure 2B:
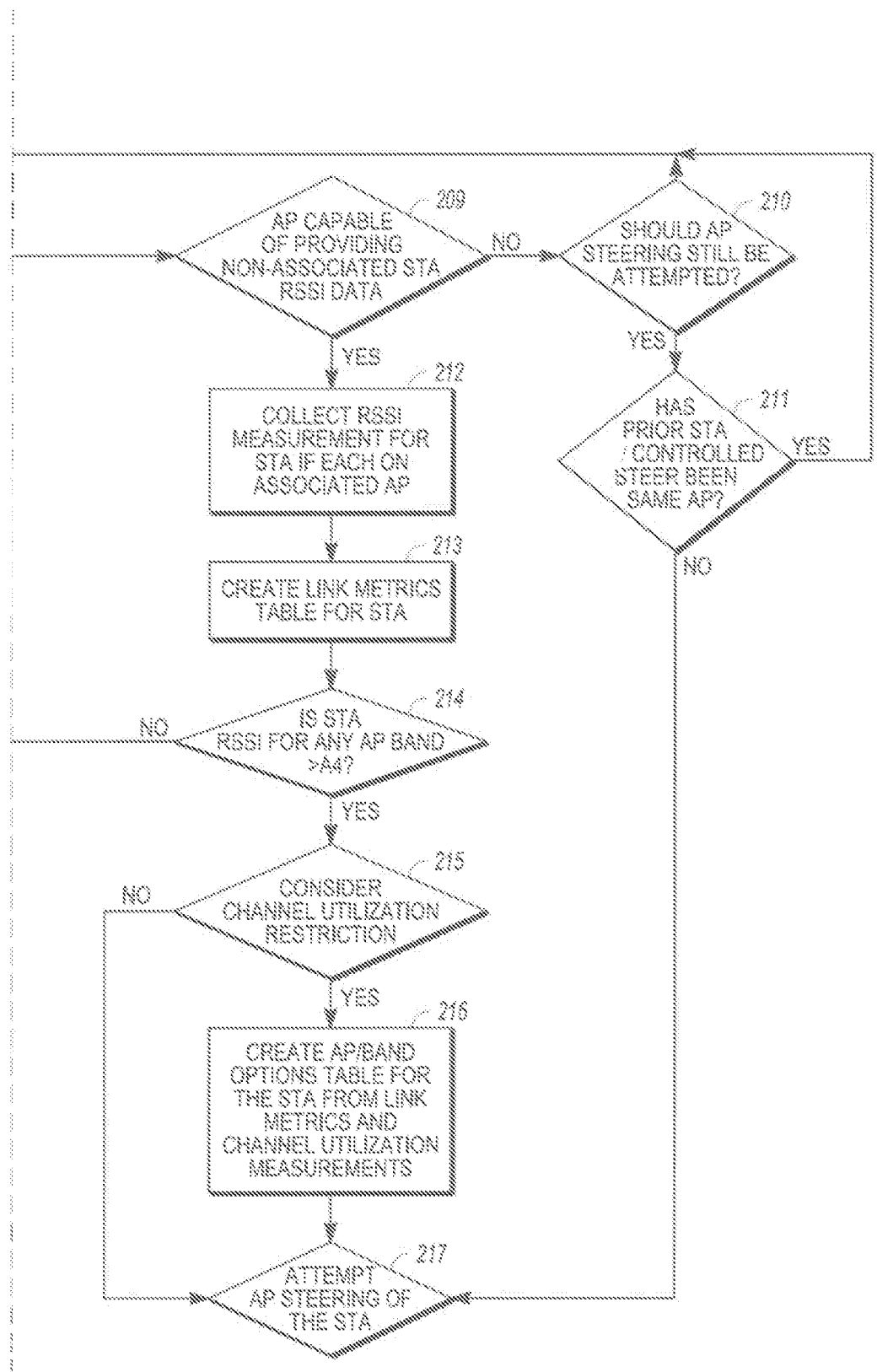

FIGS. 2A and 2B show a sequence of steps 200 that may be activated when steering a client STA from one AP to another if the client has poor link quality (e.g. RSSI or other link metrics below trigger threshold). The system controller initiates the sequence at step 201. At step 202, the wireless gateway (GW) collects RSSI data from each AP and each STA associated with the GW. At step 203, the GW determines if any associated STA has RSSI values less than threshold A1, which in this embodiment is the RSSI threshold below which AP steering from an existing AP connection should be considered. The value of threshold A1 is preferably configurable from a default value which in some embodiments may be −75 dBm, or any other desired default value. If not, the procedure returns to step 202. If so, however, at step 204 the wireless gateway GW creates an ordered list of STAs, starting from the lowest RSSI. At step 205, the top STA in the ordered STA list is chosen for subsequent processing in step 207. If there are no remaining STAs then the logic transitions back to 202. Again, if not, the process returns to step 202 but if so, at step 207 the wireless gateway checks to see if the STA steering time, which is time elapsed since the last time the STA was steered, is greater than A2. A2 is the minimum allowed delay since the last steering occurrence of the STA. It is preferably configurable, with a default placeholder of, e.g. 30 seconds. If the steering time is not greater than A2, the STA is removed from consideration at step 206 and the procedure returns to step 205 for consideration of the next sequential STA in the list. If the steering time is greater than A2, the process at optional step 208 checks whether the STA traffic level is less than A3, which is the traffic throughput below which steering is allowed. This check, when employed, is used to ensure that the STA is not currently transmitting bandwidth-intensive content, such as a video signal, which might be interrupted during the steering process. Again, this value is preferably configurable, with a default placeholder of, e.g. 100 Kbps or any other appropriate value. If the STA traffic level is not below this threshold, it removes the STA from consideration at step 206 and is directed to step 205.

If, however, the STA traffic level is below the threshold A3, at step 209, it is determined whether any AP is capable of providing non-associated STA RSSI data. If the answer is no, at step 210 it is determined whether AP steering should still be attempted. If, however, the answer at step 210 is yes, then at step 212, the RSSI measurement of the STA's link to each non-associated AP is collected and a link metrics table for the STA is created at step 213 by the wireless gateway system. At step 214 the data in the table is compared to a threshold A4 to determine whether the RSSI link quality between the STA and any AP exceeds the threshold. A4 is the RSSI threshold above which AP steering to a new AP should be considered. It is preferably configurable from a default of, e.g. −50 dBm or other appropriate value. Additionally an optional channel utilization measurement may be employed at steps 215, and 216. Whether or not the optional channel utilization procedure is used, if the threshold A4 is met in step 214, AP steering to another AP for the STA is attempted at step 217 using the link metrics table created at step 213 and any channel utilization table created at step 216, via any appropriate procedure. Idle time is another consideration but may be harder to estimate given that background management traffic always exists.

If the answer at step 209 is no, then at step 210 another decision is made as to whether steering should be attempted without having non-associated client data. If the decision at 210 is no, then the decision transitions back to 202. If the decision at 201 is yes, then the logic transitions to 211. At 211 the question is whether the STA was the last steer. If the decision at 211 is yes, the logic transitions to 202. If the decision at 211 is no, the logic transitions to attempt to steer that target STA in 217.

Figure 3:
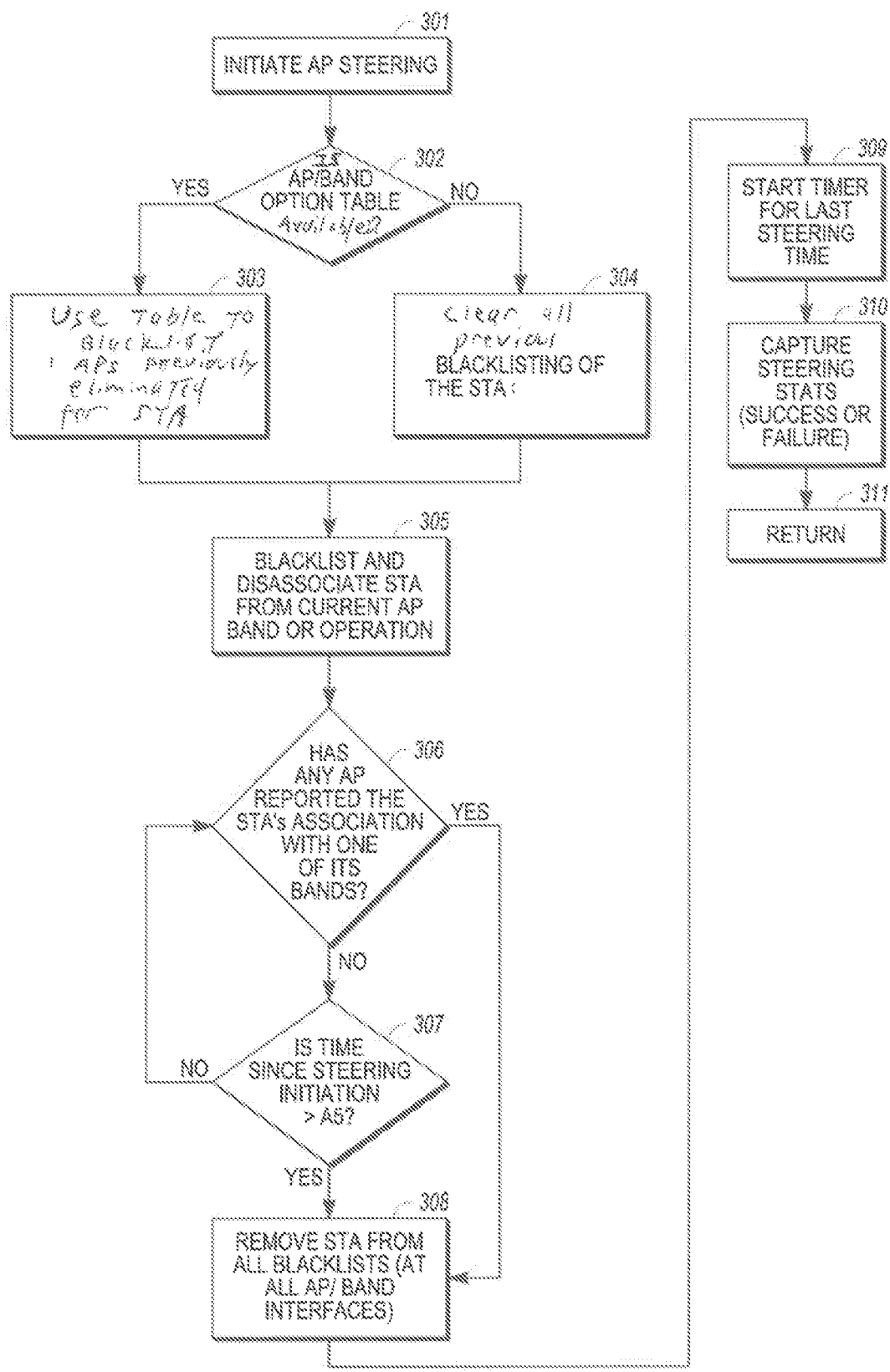
FIG. 3 shows an illustrative sequence of steps for AP and band steering of a client STA from one AP to another AP with a different band.

FIG. 3 illustrates an AP band steering solution 300 using logic at the steering controller that implements a sequence of steps involved in band steering a client STA from one over-loaded access point AP to a less-loaded AP with a different band. At step 301, the AP band steering is initiated. At step 302, the system controller checks to see whether an AP band options table is created. At step 303 GW coordinate with all APs that are not blacklisted for the STA. At step 304, when no band option table is created the GW coordinates with all APs to remove blacklisting of the current STA on either of the bands. At step 305, the controller of GW blacklists and disassociates the current AP with the STA. At 306, it detects if any of the APs has reported association of STA with one of the bands. At 307 the GW checks if time since steering initiation is greater than A5. If it is true, remove and blacklist the STA at all AP band interfaces. At 309, the GW then starts the last steering timer and captures steering stats at step 310. This blacklisting allows band steering to occur without a large amount of search between various access points.

Figure 4:
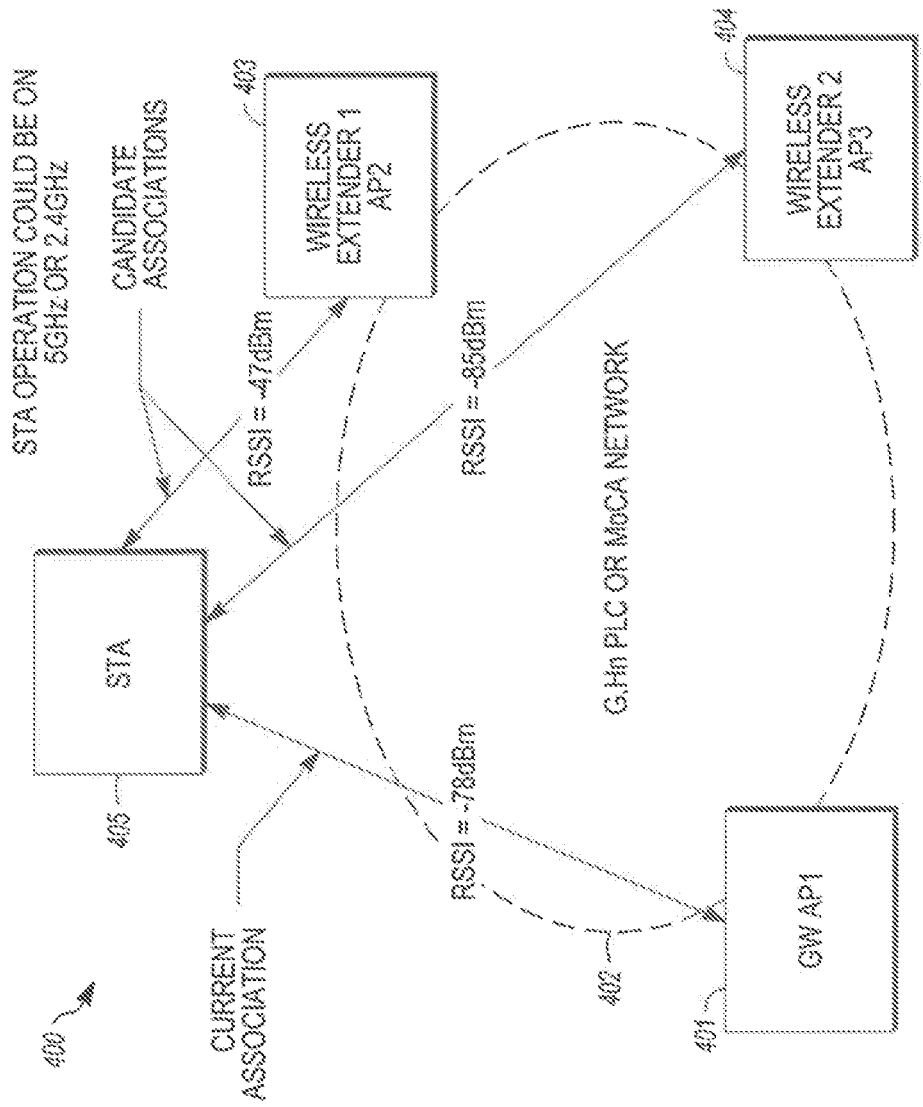
FIG. 4 shows an STA communicating with adjacent APs to determine their RSSI and assess their suitability for AP steering or band steering, or both.

FIG. 4 shows a system 400 having an STA 405 communicating with adjacent APs to determine their RSSI and asses their suitability for AP steering or band steering. The STA at 405 is currently associated with GW AP1 at 401 with an RSSI of −78 dBm. This is a weak signal, which may lead to failed communication between STA 405 and GW AP1 401. One candidate available is located at 403, WLAN Extender 1 AP2, which has an RSSI of −47 dBm. This communication will have better and more reliable communication. The other alternative is located at 404, WLAN Extender 2 AP3 with an RSSI of −85 dBm, which is not as good as AP between WLAN Extender 1 AP2 403 and STA 405. This potential information of RSSI values available at adjacent APs is communicated to the GW 402 which manages the AP steering.

Figure 5:
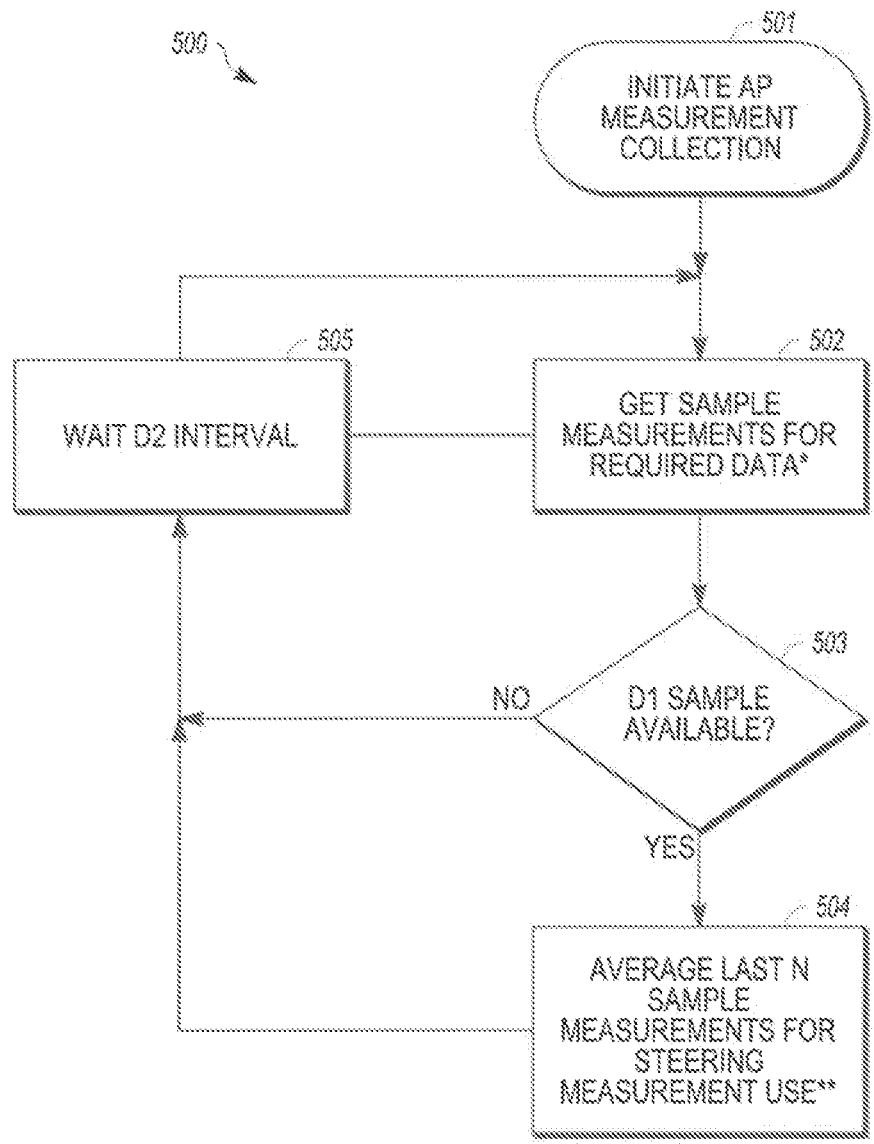
FIG. 5 shows data measurements for AP and band steering collected at each AP.

FIG. 5 shows a procedure 500 for measuring data used in AP and band steering systems. At step 501, AP measurement collection is initiated. At step 502, sample measurements for required data are collected. Required data measurements include the following for each WiFi band/interface: (i) RSSI and traffic (TX+Rx throughput) level for associated and non-associated STA; (ii) RSSI for non-associated STA (when available via AP1. Bandwidth utilization of the interface may be implemented.

Required data measurements include following for each Wi-Fi band/interface: (i) RSSI and traffic (Tx+Rx throughput) level for associated and non-associated STAs; (ii) RSSI for non-associated STA (when available via AP1 in wireless chipset); and (iii) Bandwidth utilization of the interface. At step 503 it is determined whether a threshold number D1 samples have been collected where D1 is the number of sample measurements needed to form an average measurement used for AP and band steering operations. This value is preferably configurable from a default value, which in some embodiments may be three samples. When the answer is yes, at step 504 the average of the collected sample measurements is determined and used as the steering measurement.

Sample measurements are averaged over a configurable sliding window (moving average) and made available for AP steering (for GW controller) and band steering (for local AP steering logic). The moving average is needed to provide a more reliable measurement and prevent spurious activations. Thus, if at step 503, if the threshold number of measurements have not been reached, an interval D2 is allowed to elapse before the next measurement is taken. The interval D2 is preferably configurable from a default value, which in some embodiments may be 5s. Averaged measurements should be conducted in a linear manner. So in case of RSSI, dB sample measurements should be converted to linear samples for averaging, followed by conversion back to dB for the average value.

Radio Resource Management (RRM) 802.11k includes Neighbor Reports (NR). An STA with such support can send a neighbor report request to an AP. In turn, the AP with this support returns a neighbor report to the STA. Neighbor reports contain information about known neighbor APs that are candidates for a service set transition via NeighborListSet. NeighborListSet includes information from dot11RRMNeighborReportTable (MIB in spec) concerning neighbor APs. The request/report pair enables a STA to gain information about the neighbors of the associated AP to be used as potential roaming candidates. As such it could be used by STA to address the "sticky client" problem on their own rather than having to go through the AP and GW.

Figure 6A:
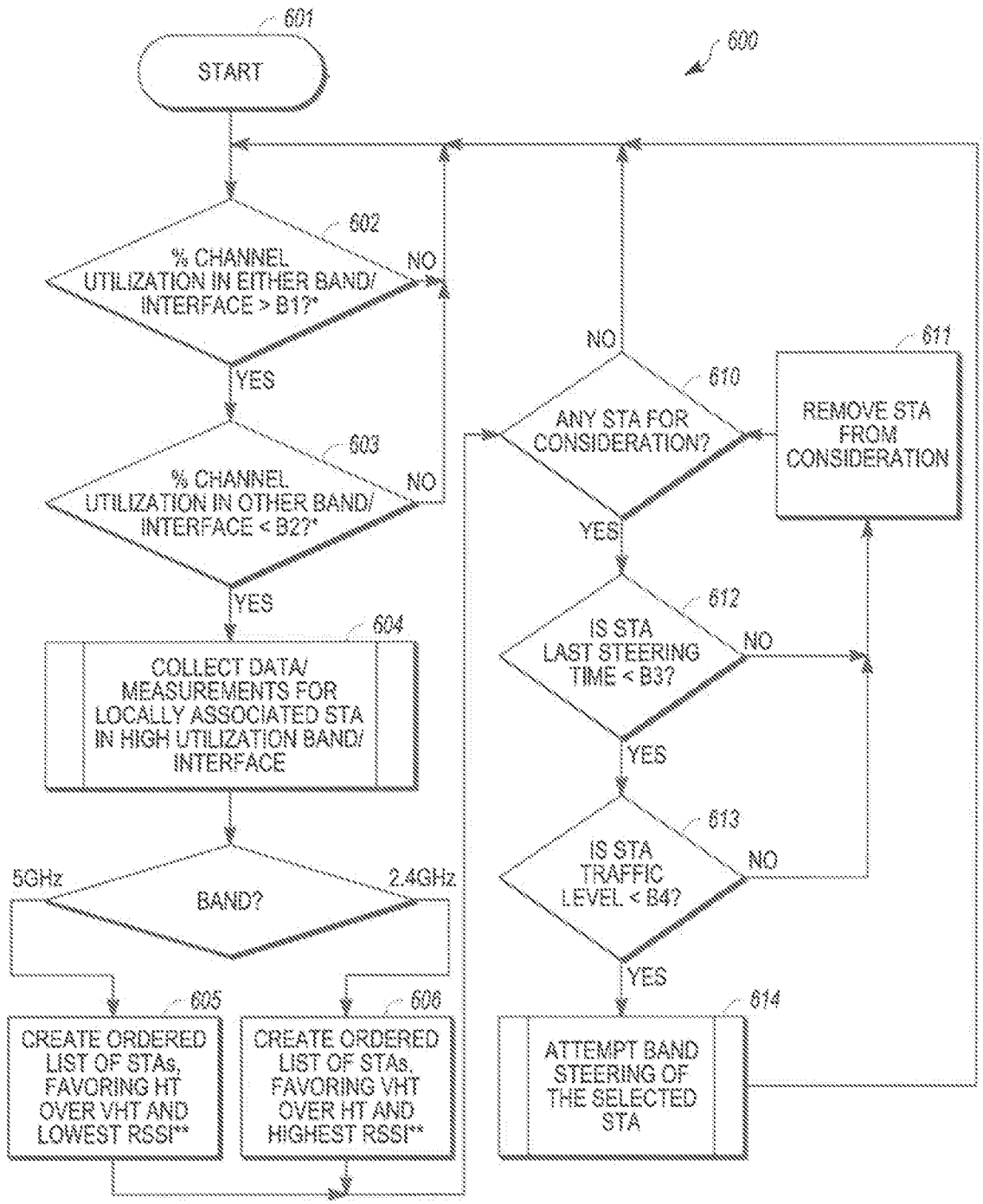
FIG. 6A shows an embodiment of the disclosure utilizing Band Steering Logic in each AP.

FIG. 6A shows a procedure 600 utilizing Band Steering Logic in Each AP. At step 601 the band steering logic application starts. At step 602, it is determined whether the percentage channel utilization in either band/interface is greater than threshold B1, where utilization refers to free airtime and B1 is the percentage channel utilization threshold above which Band steering from this band interface to the other band interface should be considered, including airtime utilization from AP and neighboring AP that share media access to the channel. As already noted, this value is preferably configurable from a default value of, e.g. 80%. If this threshold is not met, the procedure advances to step 610, descried later. If this threshold is met, at step 603 it is determined whether the percentage utilization in the other band/interface is less than B2, where B2 is the percentage channel utilization threshold below which band steering to this band interface is allowed. Again, this threshold is preferably configurable from a default value of, e.g. 50%. Again, if this answer is "no, the procedure advances to step 610, descried later. If the threshold is met, however, at step 604 data/measurements are collected for locally associated STAs in high utilization band/interface. At steps 605 and 606, an ordered list of STAs are created, respectively favoring high-traffic (HT) over very high traffic (VHT) and lowest RSSI for 5 GHz and 2.4 GHz. STAs which are determined to have only single band support may in some embodiments be removed, based on probe data or excessive, prior steering failures.

At step 610, a query is performed to determine whether there is any STA for consideration from the ordered list. If there is not, the procedure returns to step 602. If there is, the next sequential STA in the ordered list is selected for consideration and the process proceeds to step 612, where it is determined if the time that the STA was last steered is greater than a threshold B3, again configurable with a default placeholder of, e.g. 30s. This threshold determines whether the STA was too-recently steered to be steered to yet another AP. If the answer is yes, then the procedure proceeds to step 613 where it is determined whether the STA traffic level is below threshold B4, which is the traffic throughput below which steering is allowed. This threshold is preferably configurable, with a default placeholder of, e.g. 100 Kbps. If the answer is yes, an attempt at band steering of the selected STA is made at step 614. If No, remove STA from consideration at 611. In some embodiments a maximum period may be implemented for attempting to band steer a selected STA to a selected AP. This maximum period may be configurable from a default period which in some embodiments may be five seconds. Idle time is another consideration but may be harder to estimate given that background management traffic always exists.

If the answer at either of steps 612 and 613 is "no," the procedure proceeds to step 611 where the STA previously selected from the top of the list at step 610 is removed from consideration, and the process reverts to step 610 where the next sequential STA is selected. This loop may proceed until a "yes" answer is obtained at both decision steps 612 and 613 and an attempt to steer an STA to a selected AP is made.

Figure 6B:
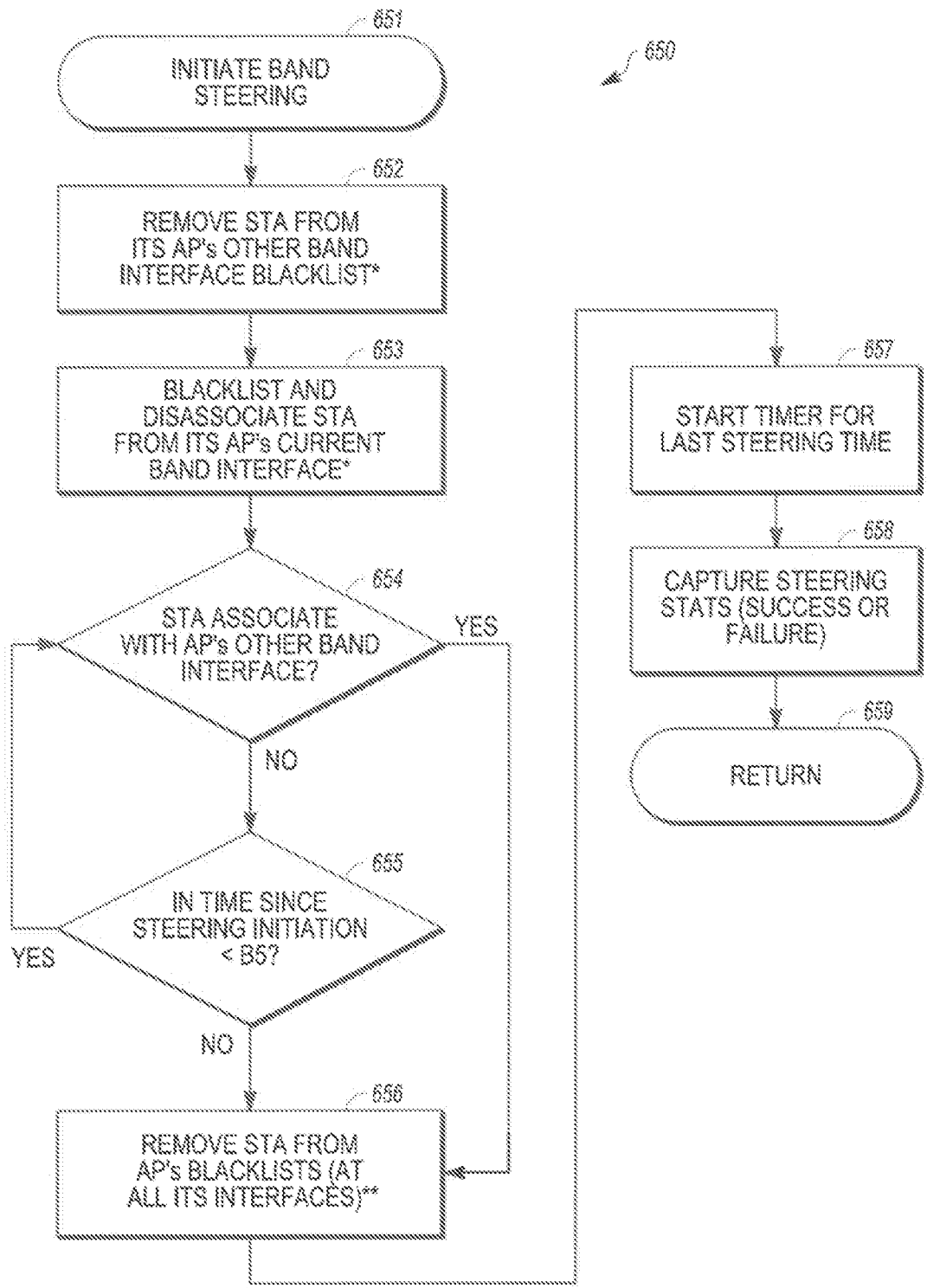
FIG. 6B shows an embodiment of the disclosure utilizing Band Steering Logic in each AP of FIG. 6A.

FIG. 6B shows a procedure 650 that in some embodiments may accompany the procedure 600. At 651 the procedure 650 is initiated. At 652 an STA is removed from its AP's other band interface blacklist, on the assumption that the STA may be steered to the AP's other band but could also be steered to another device's AP/band, assuming it is not blacklisted there. At step 653 the STA is blacklisted and disassociated from its AP's current band interface. Next, at step 654 it is determined whether the STA should associate with the AP's other band interface? If the answer is yes, the procedure advances to step 656 where the STA is removed from the AP's blacklist, at all its interfaces. If the answer is "no," then at step 655 it is determined whether the time since steering initiation is less than threshold B5, described earlier? If the answer is yes, the procedure loops back to step 654, otherwise the STA is removed from AP's blacklists at step 656. The full blacklist removal is intended to allow a STA unrestricted band/interface steering opportunity should it have the need. At step 657 a start time for last steering time is initiated. At step 658 steering statistics are captured and the procedure returns at step 659.

Summary information that the APs need for band steering information that an AP should preferably collect from its wireless interfaces (in both bands) includes: (i) AP channel utilization measurement; (ii) associated STA RSSI measurement; (iii) associated STA Wi-Fi capability (i.e. HT, VHT); (iv) associated STA traffic level measurement; and (v) band of operation for prior STA information. Information that an AP should preferably retain for all STAs it has attempted to band steer to, successfully or unsuccessfully, includes: (i) STA last band steering time; and (ii) STA last band/interface that it was steered to (parameter that may prove useful. STA steering stats should include prior data but beyond this are not needed for steering decisions. AP configuration settings for band steering includes feature selection (enable or disable) and feature threshold settings (addressed previously).

Figure 7:
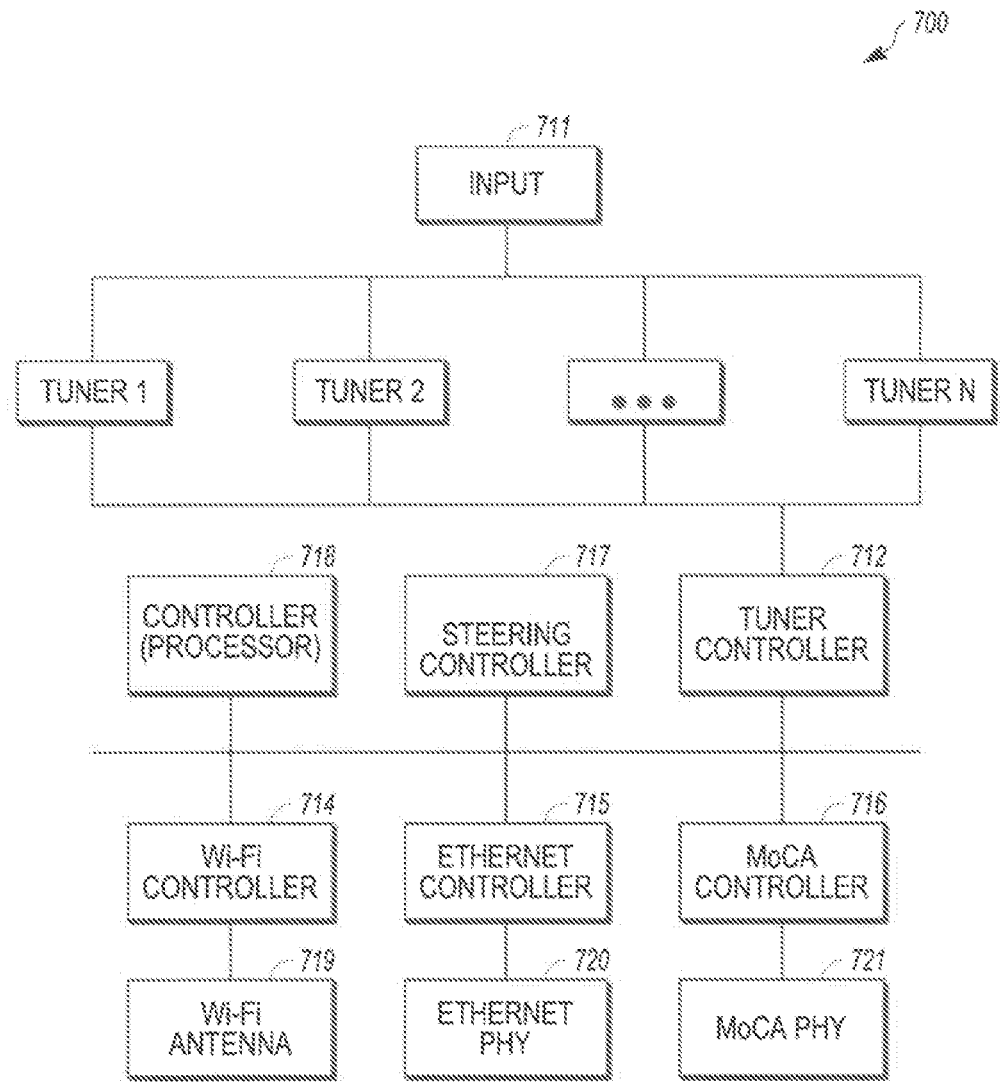
FIG. 7 shows a block diagram of a content streaming apparatus, or gateway device.

FIG. 7 generally shows an exemplary gateway device 700. The gateway device is a content streaming apparatus that is a gateway to content, data, and any information accessible through signals on input 711. The input 711 may be an RF input that connects to a content provider, such as a television program provider, by terrestrial antenna, satellite dish, or wired cable. The gateway device includes a plurality of tuners; Tuner 1, Tuner 2, . . . Tuner N, each of which selectively tunes to a requested frequency or channel of content. A Tuner Controller 712 controls each tuner to tune to an instructed frequency or channel. The Tuner Controller 712 also determines whether an unused tuner is available, and if so reserves a tuner as a destination tuner during a transfer of a streaming session from another gateway device.

The gateway device includes a controller 718, which could be implemented by an integrated circuit or circuits or by a processor, which converts content signals from the tuners to appropriate signals for wireless (e.g. Wifi or LTE) transmission via the wireless controller 714 and wireless antenna 719. The gateway device includes an Ethernet controller 715 and/or a MoCA controller 716 by which the gateway device can be networked with other gateway devices, or any other networking capable device. The Ethernet controller 715 and the MoCA controller 716 interface to the network via the Ethernet PHY (physical transceiver) 720 and MoCa. PHY (physical transceiver) 721, respectively.

The gateway device also includes a Gateway Steering Controller (GSM) 717, which monitors streaming sessions on all of the gateway devices in the network, and monitors the signal strength of the client devices. The gateway device can be in the form of a so called "set top box", AP, extender AP, etc., or may be built into a television or other media content playing apparatus.

Figure 8:
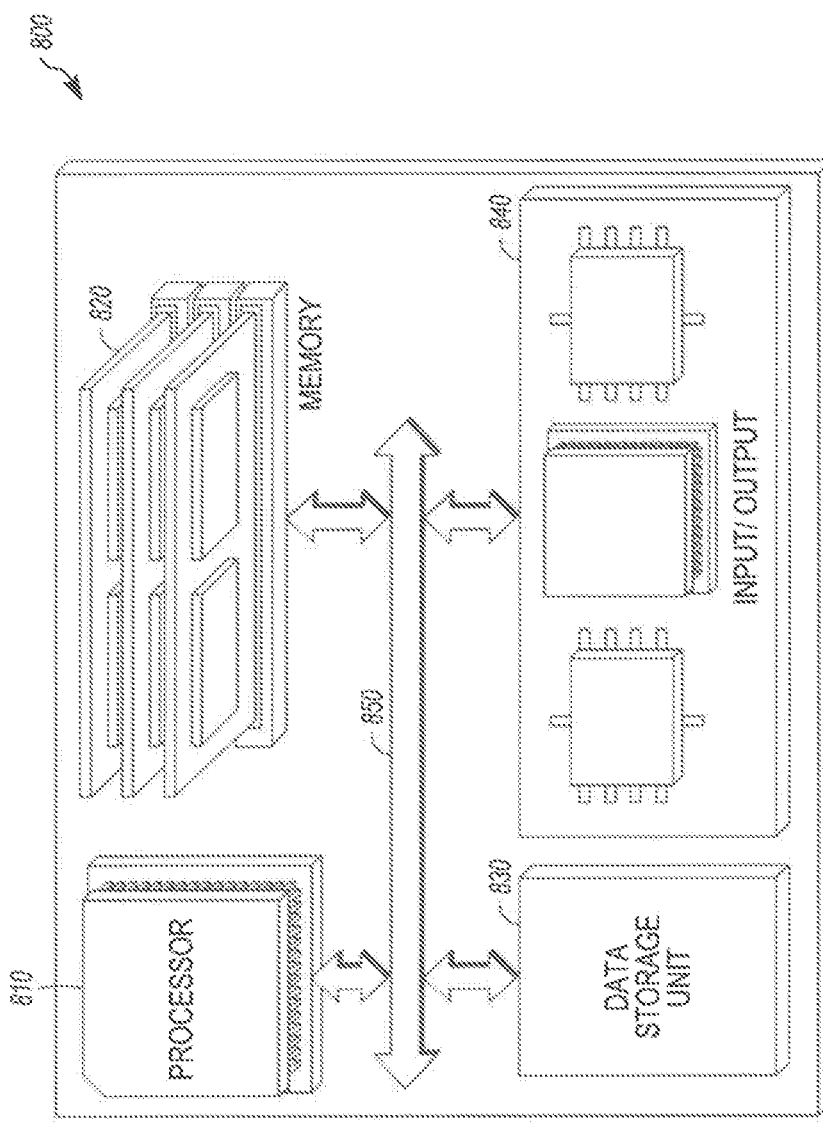
FIG. 8 shows a block diagram of a hardware configuration operable to facilitate the subject auto brightness controlled adjustment by the set-top box.

FIG. 8 is a block diagram of a hardware configuration of an AP 800 operable to facilitate the subject auto brightness controlled adjustment by a set-top box. The hardware configuration can include a processor 810, a memory 820, a storage device 830, and an input/output device 840. Each of the components 810, 820, 830, and 840 can, for example, be interconnected using a system bus 850. The processor 810 can be capable of processing instructions for execution of the subject method, system and computer readable media within the hardware configuration 800. In one implementation, the processor 810 can be a single-threaded processor. In another implementation, the processor 810 can be a multi-threaded processor. The processor 810 can be capable of processing instructions stored in the memory 820 or on the storage device 830. The memory 820 can store information within the hardware configuration 800. In one implementation, the memory 820 can be a computer readable medium. In one implementation, the memory 820 can be a volatile memory unit. In another implementation, the memory 820 can be a non-volatile memory unit. In some implementations, the storage device 830 can be capable of providing mass storage for the hardware configuration 800. In one implementation, the storage device 830 can be a computer-readable medium. In various different implementations, the storage device 830 can, for example, include a hard disk device, an optical disk device, flash memory or some other large capacity storage device.

In other implementations, the storage device 830 can be a device external to the hardware configuration 800. The input/output device 840 provides input/output operations for the hardware configuration 800. In one implementation, the input/output device 840 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device (e.g., access point, cable modem, router, wireless extender, or other access device) or subscriber device (e.g., set-top box/station, etc.). In another implementation, the input/output device can include driver devices configured to send communications to, and receive communications from one or more networks (e.g., WAN, local network, cloud, headend/cloud controller, etc.).

Further embodiments relate to HNC Steering logic and controller steering, including, for example, controller steering, support for STA queries, steering data package and NVG parameters. Such embodiments provide an ability, for example to:

(i) Move a client (STA) "stuck" with a bad link quality on one AP in a residence to another AP with "better" link quality, where an AP may be defined per TR-181 Access Point where it is a single B SSID configured with an SSID and Encryption Type with associated QoS, etc. Those of ordinary skill in the art will appreciate that air-time fairness logic provided by chipset vendors will prevent a client with poor link quality from excessive airtime use, but this client may be better off being moved;

(ii) Optimize channel utilization in a given WLAN device to avoid overloading one AP over another AP; and In either of these embodiments, dynamic ("smart") channel selection may be employed from the chipset vendor and operate in parallel to client steering, which tends to be interference driven.

In some embodiments, home network extender considerations may include a residential network comprised of a residential gateway (RG) and zero or more associated WLAN home network extenders (HNEs). Any included HNE may have Ethernet, G.hn, MoCA or other network path(s) to the RG. The RG and HNE may have different Wi-Fi channel(s) on their AP to maximize Wi-Fi network utilization. Alternatively any HNE may have a wireless network path to the RG. This wireless path may be dedicated if the HNE have two radios (for a given band) or shared (the latter case being what is typically called a wireless repeater). An HNE with shared radio channel (repeater) may require channel selection coordination when the RG channel changes.

Band considerations, in some embodiments, may include clients (STAs) that support single or dual band Wi-Fi. Wireless STBs may typically be 5 GHz single band devices. Mobile devices may typically be dual band with dual-band selectable operation. The RG may be assumed to be dual band with dual-band concurrent operation. Multiple 5 GHz radios are a special case which may be included in band-steering operations, if desired. An HNE may be dual band with concurrent radio operation, or only single band (2.4 GHz or 5 GHz operation). Preferably, solutions or implementations used according to the disclosures herein are flexible to accommodate any AP combinations. Embodiments of the present disclosure implemented in a star network topology may include a mesh solution.

Preferably, steering should only happen between extended service sets (ESSs), which are by definition APs (BSSIDs) that contain the same SSID, Encryption Type, in the case of WPA/WPA2 the same passphrase, and for 802.1x the same authentication authority. The RG and HNE AP in a residence preferably share the same SSID, encryption type, and passphrase. WPA2-Personal has PMK SA which is calculated internally per WFA after initial STA association with the passphrase and BSSID. A short delay results from 4-way handshake using the calculated PMK to establish PTK.

Embodiments of the present disclosure employed in conjunction with 802.11r (Fast BSS transition) preferably utilize Preauthentication (section 11.5.9.2 of IEEE 802.11 2012 standard) using 802.1x for PMK SA distribution to BSSIDs.

Hot spot operation may preferably only apply to the RG, as having a hotspot on HNE could result in residential user gaining unencrypted access to the hotspot traffic passing to their RG.

Steering logic preferably commences following the establishment of a secure communications link between the RG and HNE. RG to HNE data link security can be achieved via secure setup solution (e.g. via IEEE1905.1a secure setup for G.hn or MoCA link). On-board Home Network Extender (HNE) logic may be used for discovery, followed by secure HTTPS configuration, data collection, and steering logic. Steering logic should make use of 802.11v BSS transition management when supported by the clients.

Blacklisting support is needed when 802.11v is not supported. 802.11v steering support should also be provided for STA with BSS transition queries. Steering logic requires averaging several sample measurements (in a configurable sliding window). Averaging is needed to provide a more reliable measurement and prevent spurious activations. Weighted averaging favoring more recent measurement may be utilized as needed.

In some embodiments, steering control logic (Home Network Controller—HNC) may be included in the RG, which simplifies network control and more easily supports alternative cloud based control, at least in part. Though this incurs a cost of needing more data exchange between HNE and RG, the cost can mitigated by configurable, restricted data collection and control communication intervals. Even though embodiments described herein may implement steering logic in a RG or other gateway, those of ordinary skill in the art will understand that steering logic, i.e. a steering controller, may be implemented in any network device, or distributed among network devices.

Figure 9:
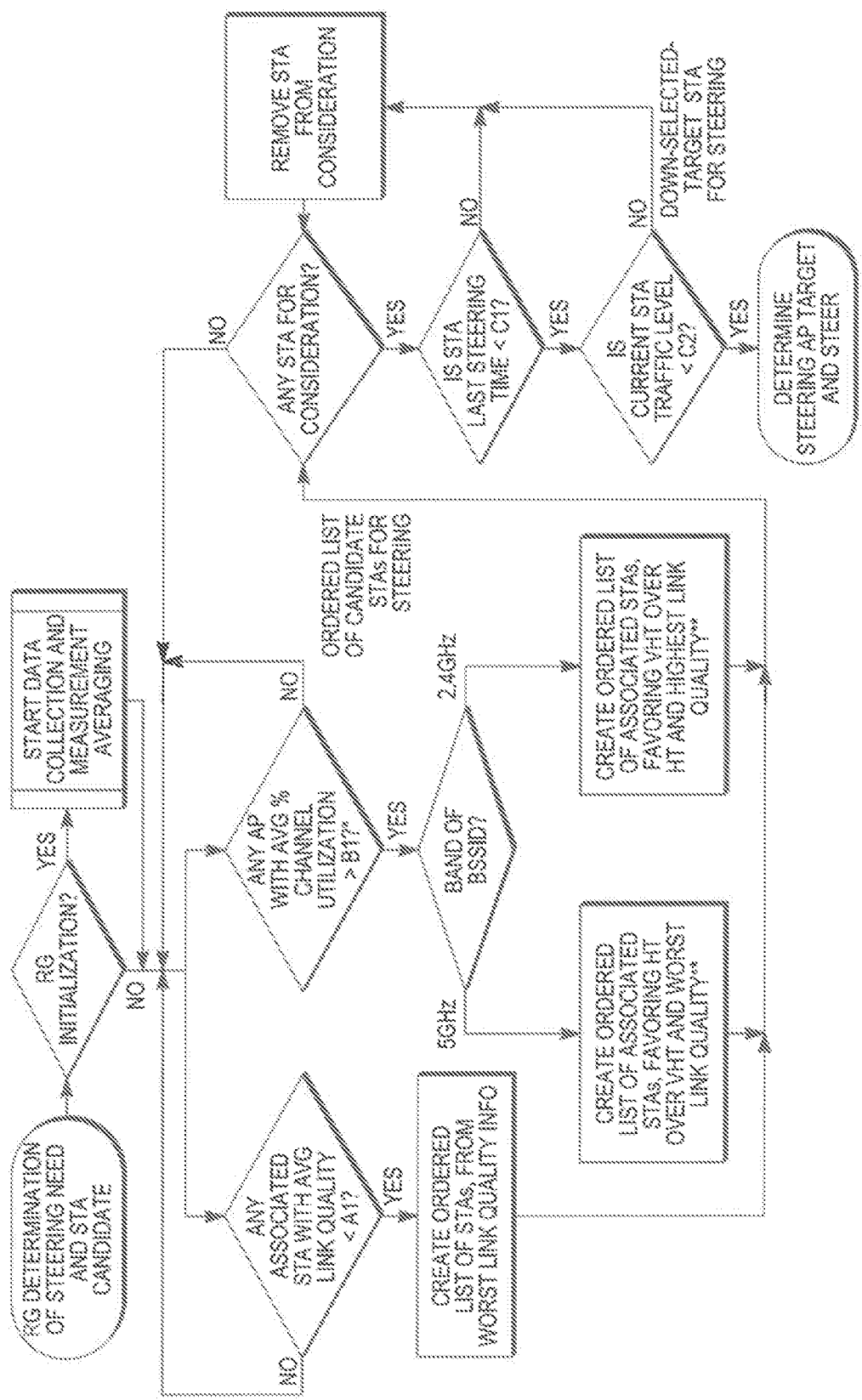
FIG. 9 shows an embodiment that determines if steering of an STA to a new AP.

Further embodiments determine if steering is needed, then choose candidate station to steer; for example, in accordance with the illustrative logic shown in FIG. 9. In some embodiments, steering determinations and the following STA selection parameters are configurable:

(i) A1 is the STA link quality threshold below which steering trigger should be considered MCS rate, SS count with default of 2, 1

RSSI (received at RG) is fallback metric if MCS/SS not available, with default of −75 dBm (ii) B1 is the AP utilization threshold above which steering should be considered Percent utilization includes airtime utilization from the AP and its neighboring AP that share media access to the channel Default placeholder of 75%

(iii) C1 is minimum allowed delay since last steering occurrence

Figure 10:
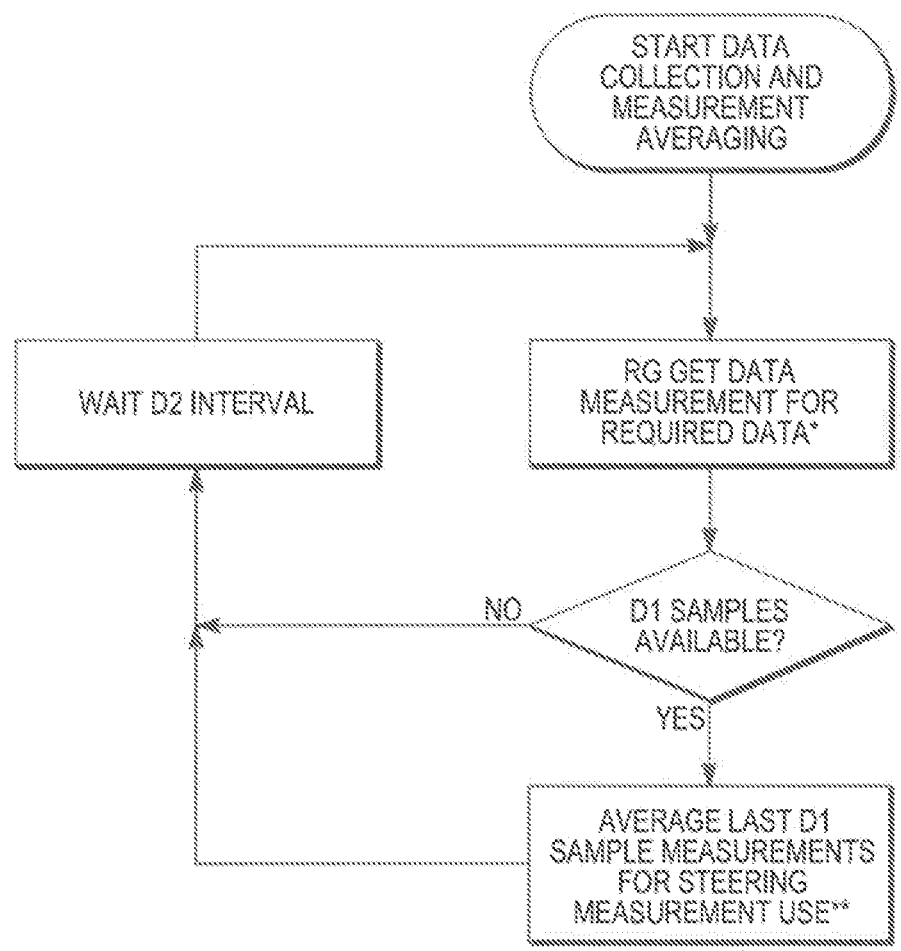
FIG. 10 shows illustrative logic for measurement averaging to be used in accordance with steering systems and techniques.

Default placeholder of 30 s (iv) C2 is traffic level below which steering is allowed Default placeholder of 10 Kbps Idle time is another consideration but may be harder to estimate given that background management traffic always exists Additional logic could be added to avoid attempting the same steer to the same location should this condition occur In such embodiments, data collection to support steering may be collected by the RG, which should collect select data measurements from each HNE AP and should include such data along with its own AP data to determine if an issue exists that warrants steering a client. Minimum AP channel utilization measurements may include a current AP's percentage airtime utilization. STA quality measurements may include current link quality measurements, depending on their availability, such as Current SNR, Current RSSI, Current MCS rate, Traffic level. In each of these measurements, a measurement running average may be used. When used, measurement averaging; may be implemented in accordance with logic illustrated by FIG. 10, for example. In such embodiments:

Measurement samples may be averaged over a configurable sliding window (moving average) for steering logic. Averaging is needed for more reliable measurements to prevent spurious triggers. D1 is the number of samples to average (moving average window size), which may be configurable with default of 5. D2 is the sample interval, which is configurable with default of 2s; and (ii) The moving average may be weighted to favor more recent measurements, where $$Avg=(w1*x1+w2*x2+ \ldots +wn*xn)/(w1+w2++wn)$$
$$where(w1+w2+ \ldots +wn)=1$$

and where weightings are configurable.

In still further embodiments, selective AP capability may be determined, including determining the AP support for 802.11v BSS transition management, 802.11k capability/information as a whole, the number of associated clients, channel support. Selective STA capability may also be determined, including AP support for 802.11v BSS transition management, 802.11k capability/information, Channel support, HT or VHT capability, Band support (dual band, 5 GHz only, 2.4 GHz only, etc. and if not available, band could be determined from steering failure scenarios), HNE connection status with the RG including link type (wired and wireless info), capacity, utilization, etc. and RG WAN connection status may also be needed if/when hotpot service is utilized in HNE.

Embodiments may also provide 802.11k client reports and other data for steering refinement considerations. For example, 802.11k client reports could supplement steering logic. A beacon report, i.e. a client view of OBSS interference including all neighboring APs may be useful for channel change logic but could also be used to determine whether to push STA from RG hotspot to neighbor hot spot depending on the RG utilization. A channel load report of client channel utilization data could be useful for channel change logic but could also serve as trigger to initiate STA steering, but in this case would need an STA-specific utilization threshold for a trigger. A Link measurement report for client RSSI data could be a useful supplement to AP link quality metrics as client RSSI data is downstream from the AP. Other STA data that could supplement steering logic include the type of clients (e.g. STBs, game consoles, wireless phones) which could be used as secondary consideration for avoiding select APs. Those of ordinary skill in the art will understand that high active QoS streams could be useful for channel change logic and select steering logic, and could be used to inhibit off-channel scans.

Figure 11:
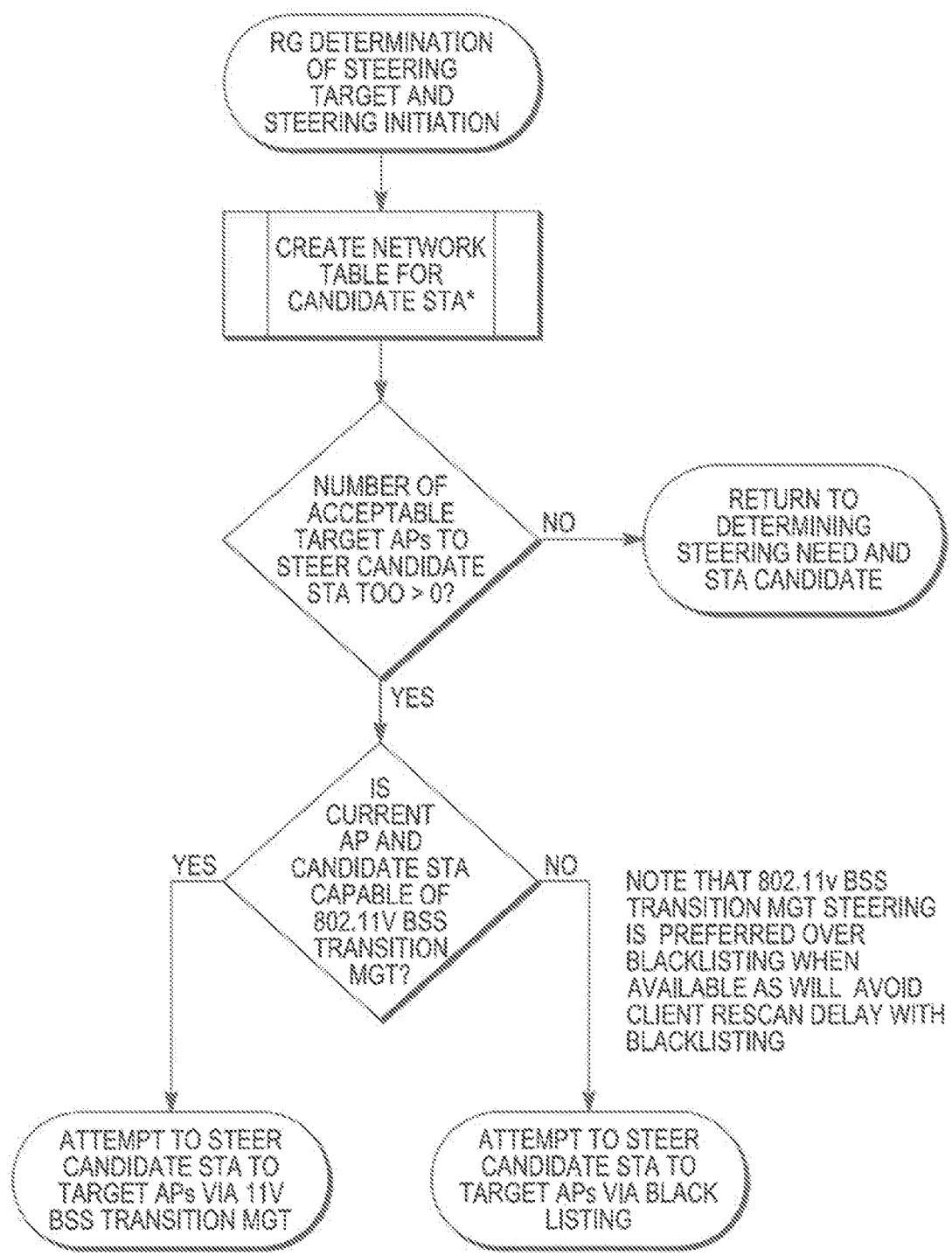
FIG. 11 shows an embodiment of logic for determining steering target APs and initiating steering.
Figure 12:
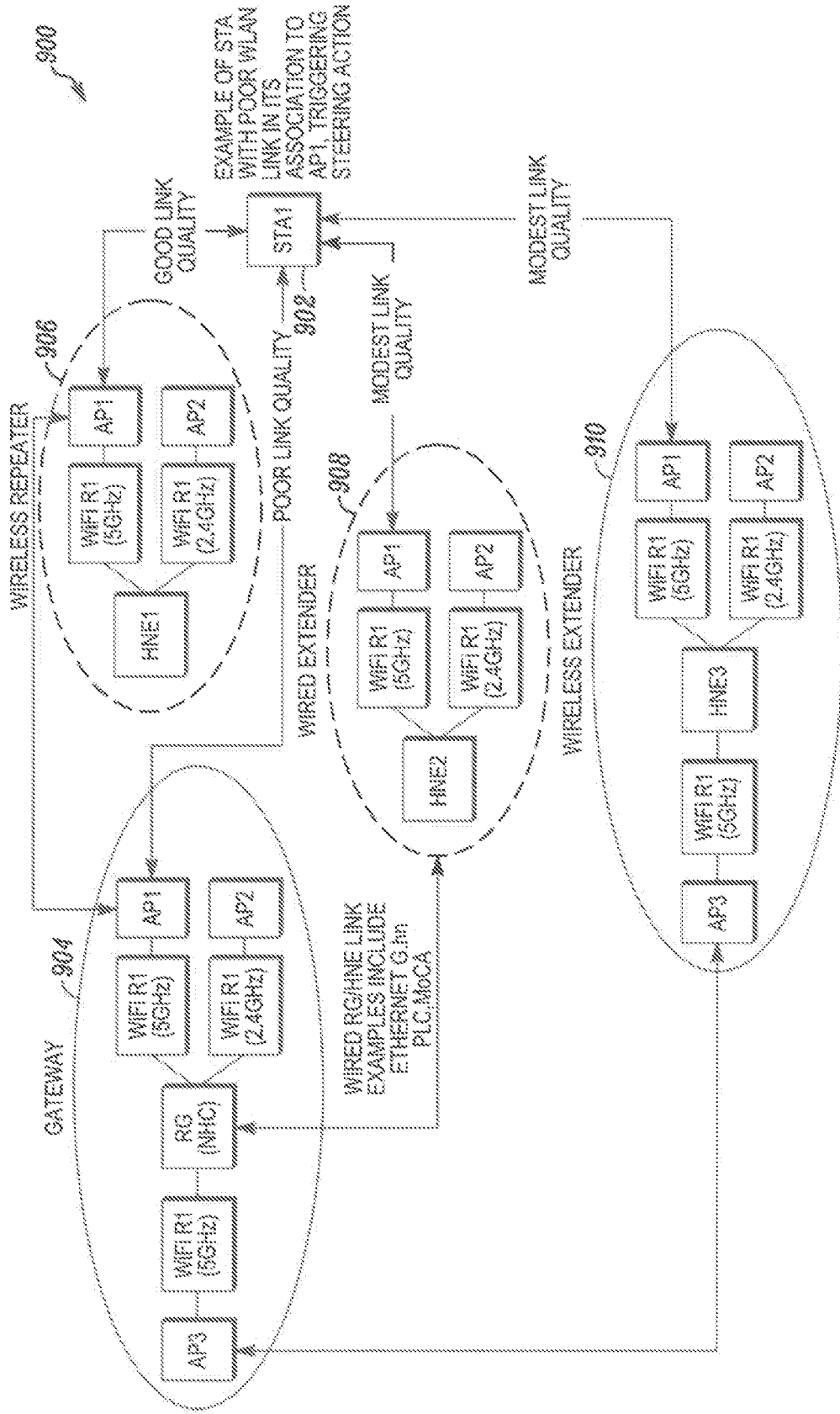
FIG. 12 shows an exemplary wireless network having an STA connected to a gateway and a plurality of home network extenders, used to illustrate embodiments of the present disclosure.

Further embodiments may be able to determine steering target APs and initiate steering, using logic such as that shown in FIG. 11 for example, by providing network table creation for candidate steering STA. For example, a multi-part table of WLAN AP may be used to screen an AP for a candidate STA, removing some and prioritizing the remainder as target APs. Screening may involve use of configurable thresholds for different screening conditions in the table, which preferably includes multiple parts including HNE WLAN and HNE/RG connection parts. The HNE WLAN part preferably includes AP characteristics and associated candidate STA information, as available, though the candidate STA's link quality information may only be available for its associated AP. The HNE/RG connection part may include HNE/RG connection type information and connection status information An example of a network scenario is illustrated in FIG. 12, which shows a system 900 having a client STA 902 connected to an RG 904, a wireless repeater HNE1 906, a wireless extender HNE2 908, and a wireless extender HNE3 910. The link quality between the STA 902 and the RG 902 is poor, while the link quality between the STA 902 and HN2 as well as HNE 3 are modest. The link quality between the STA 902 and HNE1 906 is good. Specific metrics for this embodiment are shown in Table 1A

TABLE 1A

| Device | AP | Channel utilization | Associated client count |
|---|---|---|---|
| RG | AP1 (5 GHz)* | 49% | 10 |
|  | AP2 (2.4 Ghz) | 30% | 5 |
| HNE1 | AP1 (5 Ghz)* | 78% | 6 |
|  | AP2 (2.4 GHz) | 36% | 4 |
| HNE2 | AP1 (5 Ghz) | 41% | 3 |
|  | AP2 (2.4 GHz)* | 61% | 5 |
| HNE3 | AP1 (5 Ghz) | 35% | 6 |
|  | AP2 (2.4 GHz) | 38% | 4 |

In this embodiment, a threshold F1 percentage channel utilization is applied, below which steering to an AP is allowed. This threshold has a default of 60%, which may be configured. Similarly a threshold F2 maximum associated STA count limit above which steering is not allowed is applied. This threshold in some embodiments can be different per AP and is typically set by the operator. For the purpose of this embodiment we assume a limit of 10 for all APs. Utilizing these two thresholds, eliminated AP are starred above. Note that AP3 in RG and HNE3 is not shown because it is used only for HNE3 wireless extension to the RG STA capabilities for this embodiment are shown in Table 1B.

TABLE 1B

| Device | AP | Candidate STA link quality | Supported channel correlation | Channel coverage mismatch | Candidate STA capability |
|---|---|---|---|---|---|
| RG | AP1 (5 GHz) |  | Yes | Yes | VHT |
|  | AP2(2.4 GHz)* | 2, 1 | Yes | No | VHT |
|  | AP3 (5 GHz) |  | Yes | No | VHT |

TABLE 1B-continued

| Device | AP | Candidate STA link quality | Supported channel correlation | Channel coverage mismatch | Candidate STA capability |
|---|---|---|---|---|---|
| HNE 1 | AP1 (5 GHz)* |  | No | No | VHT |
|  | AP2 (2.4 GHz) |  | Yes | No | VHT |
| HNE2 | AP1 (5 GHz) |  | Yes | No | VHT |
|  | AP2 (2.4 GHz) |  | Yes | No | VHT |
| HNE3 | AP1 (5 GHz) |  | Yes | No | VHT |
|  | AP2 (2.4 GHz) |  | Yes | No | VHT |
|  | AP3 (5 GHz) |  | Yes | No | VHT |

In this embodiment, it is assumed that the candidate STA is operating on AP2 of the RG. Non-associated AP link quality measurements are unlikely to be available so are not shown. A link quality threshold F3 is applied, above which AP steering to a new AP should be considered, (when client quality metrics available). MCS Rate, SS count may be used as a metric, with the RSSI received at the RG used as a fallback metric if MCS/SS is not available. Further, channel correlation may be applied to eliminate APs with operating channels that are not supported by the candidate STA, which will also screen out STAs that do not support an AP's band. Channel coverage mismatch may also be applied to lower the priority of APs with broader channel map coverage than STA support, which is pertinent for APs running auto-channel selection. An STA capability of VHT is assigned lower priority for 2.4 GHz AP, and HT would be assigned lower priority for 5 GHz AP. Using these criterial, eliminated APs in table 1B are starred in the table.

An example HNE/RG connection type for the embodiment illustrated in FIG. 12 is shown in Table 2A below.

TABLE 2A

| Device | AP | RG/HNE link type | Link protocol/ characteristic | AP for wireless link |
|---|---|---|---|---|
| RG | AP1 (5 GHz) | NA | NA | NA |
|  | AP2 (2.4 GHz) | " | " | " |
| HNE1 | AP1 (5 GHz)* | Wireless | Shared WiFi radio (repeater) | AP1 |
|  | AP2 (2.4 GHz)* | " | Shared WiFi radio (repeater) | NA |
| HNE2 | AP1 (5 GHz) | Wired | G.Hn 2.0 | NA |
|  | AP2 (2.4 GHz) | " | " | " |
| HNE3 | AP1 (5 GHz)* | Wireless | Dedicated WiFi radio (extender) | NA |
|  | AP2 (2.4 GHz)* | " | Dedicated WiFi radio (extender) | " |

In this embodiment, the HNE APs with wireless links to the RG have all their AP tagged with lower priority than HNE APs with wired links to RG. Also, an HNE and RG AP used just for dedicated wireless link between HNE and RG should be eliminated as target AP for the candidate STA. Lower priority APs are starred in table 2A.

An example of HNE/RG connection status for an embodiment is shown Table 2B.

TABLE 2B

| Device | AP | HNE/RG link supported PHY rate (Mbps) | Estimated supported throughput (Mbps) | Current HNE/RG link traffic throughput (Mbps) | HNE/RG link utilization |
|---|---|---|---|---|---|
|  | AP1 (5 GHz) | NA | NA | NA | NA |
|  | AP2 (2.4 GHz) | " | " | " | " |
| HNE1 | AP1 (5 GHz)* | 500 shared | 250 | 200 | 80% |
|  | AP2(2.4 GHz)* | " | " | " | " |
| HNE2 | AP1 (5 GHz) | 900 shared | 450 | 250 | 56% |
|  | AP2 (2.4 GHz) | " | " | " | " |
| HNE3 | AP1 (5 GHz) | 600 shared | 300 | 200 | 67% |
|  | AP2 (2.4 GHz) | " | " | " | " |

A PHY rate threshold G1, configurable from a default value of 500 Mbps is applied, below which AP steering to a new AP is a concern and should be prioritized lower. The PHY rate reflects the HNE/RG link quality. A utilization threshold G2 is also applied, configurable from a default value of 75%, above which AP steering to a new AP is a concern and should be prioritized lower. Using these thresholds, lower priority APs are starred in FIG. 2B. The current HNE/RG link traffic rate is the aggregate of current upstream+downstream traffic. Traffic rate can be derived from traffic byte counts over measurement periods. Those of ordinary skill in the art will understand that additional metrics/logic can be added as needed. Those of ordinary skill in the art will also appreciate that HNE/RG PHY rates for G.hn, MoCA, and WiFi apply to shared Tx opportunities but Ethernet PHY rate (if present) would be bidirectional. Also, For simplicity it was assumed that estimated supported throughput is 50% of supported PHY rate in shared networks such as G.hn, MoCA, and WiFi and 95% for Ethernet links, though this assumption can be refined as needed.

An example Network table outcome for the foregoing embodiment is shown in FIGS. 13A and 13B, which provide a summary of the prior tables with example input. Applying the foregoing tables and disclosure leaves the following AP targets for the candidate STA: (i) HNE2 AP1 as the preferred target AP; (ii) HNE3 AP1 as the next preferred target AP; and (iii) HNE1 AP2 and HNE3 AP2 as lower priority target.

Figure 14:
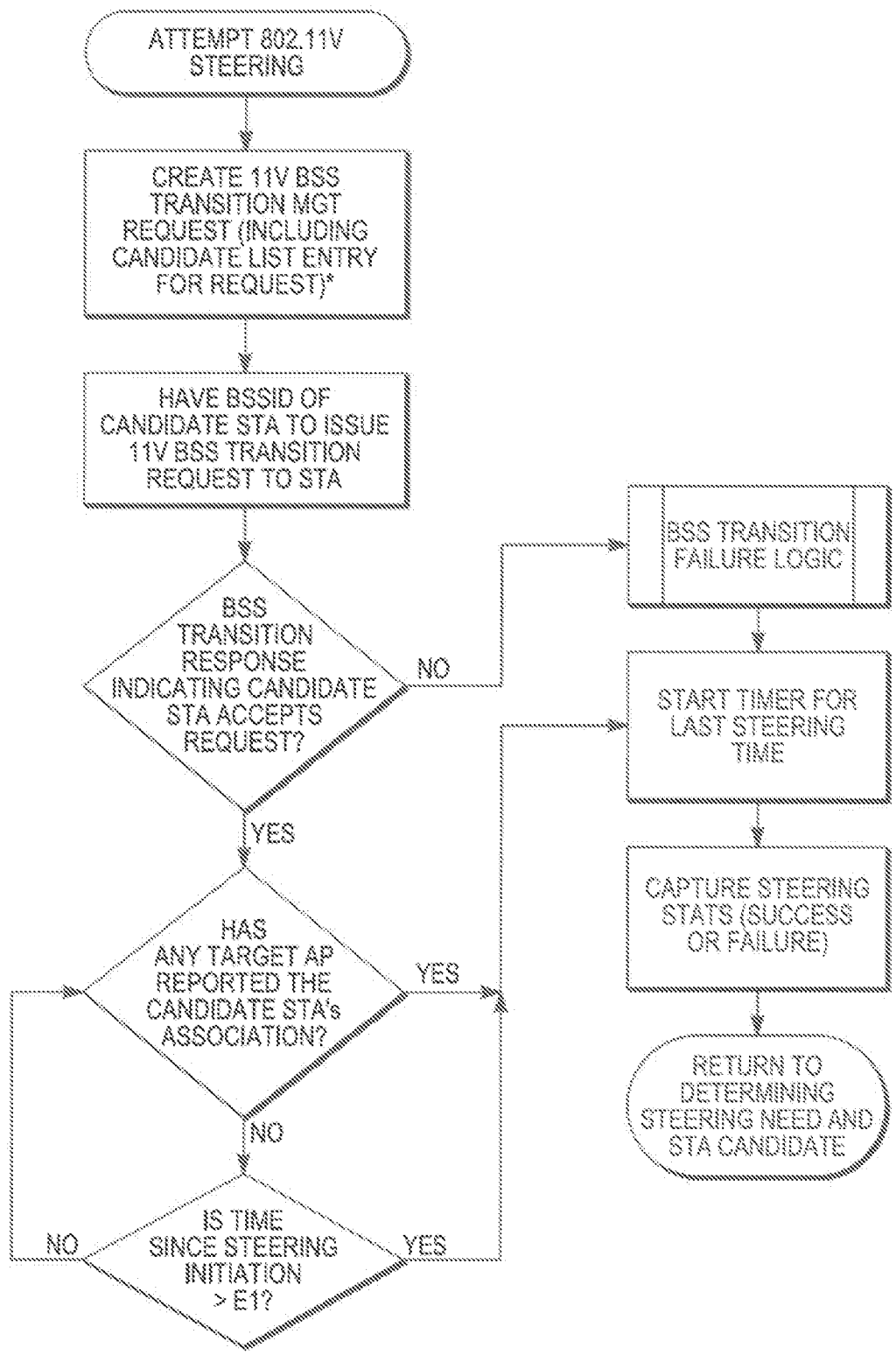
FIG. 14 shows logic for BSS transition management steering.

Further embodiments are able to attempt 11v BSS transition management steering. For example, an 11v BSS transition management steering attempt may be performed with the 11v BSS transition management steering attempt logic illustrated in FIG. 14. Still further embodiments provide BSS Transition failure logic. For example, steps taken in the case of BSS Transition failure may at a minimum include having the RG note transition failure resulting from STA rejection of an RG BSS transition message request, and depending on the severity of AP channel utilization or candidate client link quality, the logic may decide to then force a blacklist steer of the client.

Figure 15:
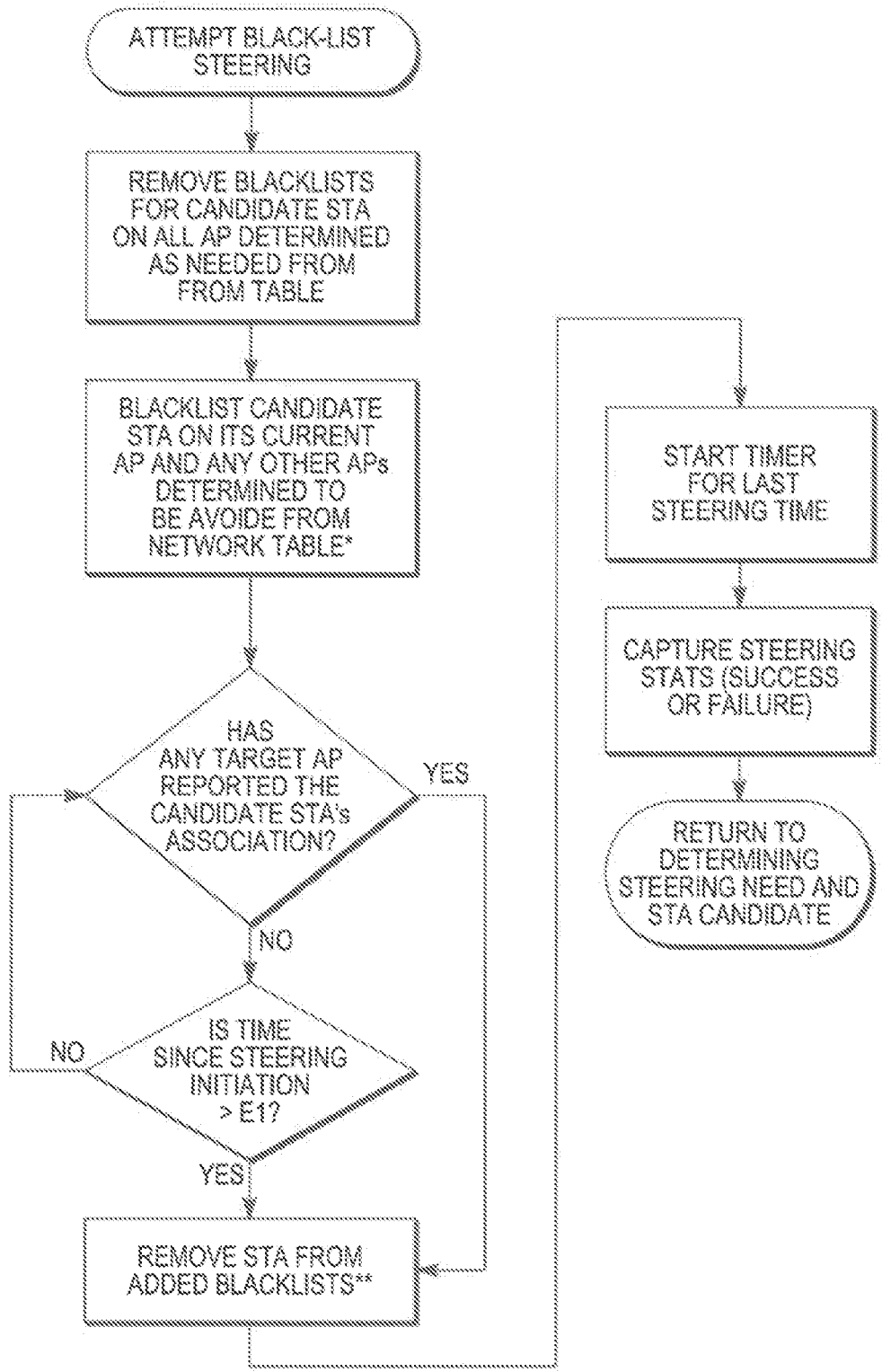
FIG. 15 shows illustrative blacklisting steering attempt logic used in accordance with the embodiments described in the disclosure.

In some embodiments, a blacklist steer of a client (or a blacklisting steering attempt) may include, for example, steps in accordance with the illustrative blacklisting steering attempt logic shown in FIG. 15. In further embodiments, steering attempt parameters include: (i) a maximum period E1 allowed for steering occurrence, which is configurable with default of 5 s for Blacklisting or configurable with the number of beacon transmission times (TBTTs) for 802.11v BSS transition if a Disassociation Timer is utilized; (ii) steering statistics, which may be updated with notations indicating steering success or failure and steering history; and (iii) a Steering timer that is reset upon a steering attempt.

Still further embodiments provide support for STA queries. In an illustrative example, steering support is also needed for AP to respond to an STA BSS transition management query; for example, following an 802.11v capable STA query. In an example of an embodiment of STA query support, the following is provided: (i) the steering support will run in parallel with RG controller steering logic discussed previously and will be conducted at the HNE that supports 802.11v since there is inadequate time for the RG/HNC to react to this request at a particular HNE; and (ii) the logic to support STA queries involves the RG (as HNC) periodically providing its HNE with Neighbor Report (NR) information needed for 11v BSS transition management request. The period for the NR push is configurable with a default of 60 s and the HNE will reply to a STA BSS transition management query with the HNC provided NR in its BSS transition management request.

Further embodiments are able to use network table information. In an illustrative example of an embodiment the following use of network table information is provided: (i) the RG/HNC will periodically create neighbor reports (NR} with prioritized candidate AP listing for HNE 11v BSS transition meeting requests; and (ii) the prioritized candidate AP listing in the NR will be derived from network table information—the RG accumulates minus part 1b WLAN candidate STA characteristics. STA-specific characteristics should not be used to create NR candidate AP listing for HNE BSS transition meeting request to respond to STA BSS transition meeting queries because the STA is not known a priori.

FIGS. 16A and 16B show a summary of the prior tables with example input, minus part 1b WLAN candidate STA characteristics. Using the criterial described earlier for prioritizing AP targets, HNE2 AP1 as the preferred target AP, HNE3 AP1 and HNE3 AP2 are the next preferred target APs, and HNE1 AP2 is the lower priority target AP. As with RG/HNC initiated steering, the RG is responsible for collecting the status and stats on STA query initiated steering. This requires the RG to learn the outcome of an HNE BSS transition management request following a STA BSS transition management query. It also requires the RG to determine if/when the STA transitions to another HNE AP In some embodiments, a steering data package for HNE and/or NVG data model objects are provided. For example, a steering data package for HNE may include capabilities reporting, configuration, and steering. NVG data model objects may include configuration and stats. HNC can also expose all HNE data package objects as required.

Steering logic exists largely in the RG and commences following the establishment of a secure communications link between the RG and HNE. Home Network Extender (HNE) logic will be used for discovery followed by secure HTTPS configuration, data collection, and steering logic.

Figure 17:
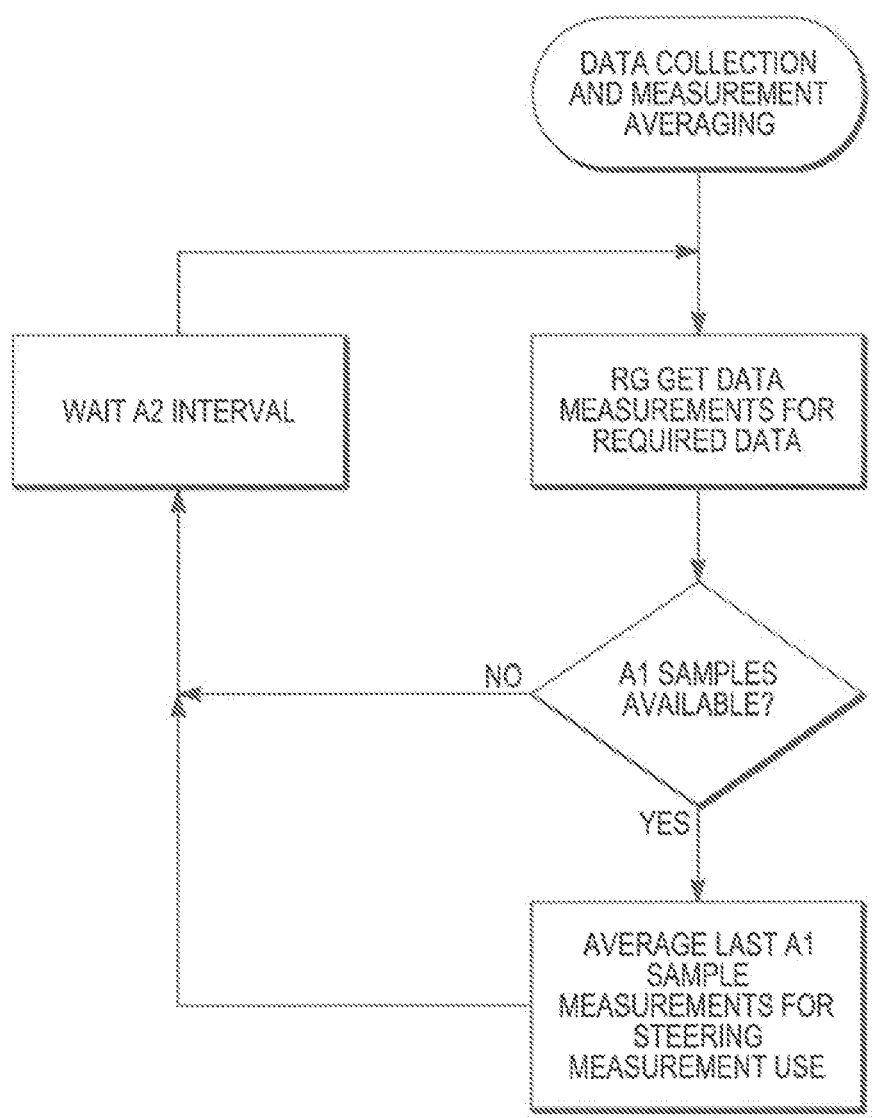
FIG. 17 shows an exemplary procedure for sampling and measurement sample averaging.

The first step in steering logic is RG data measurement sampling and measurement sample averaging, as illustrated in FIG. 17. This involves the collection of data measurement samples at a periodic interval and averaging the sample measurements over a sliding window. Averaging is needed to provide reliable measurements and prevent spurious steering triggers and decisions in general. Weighted averaging support favoring more recent measurement samples is required. This follows the logic:

$$\text{Avg} = (w1*x1 + w2*x2 + \ldots + wn*xn)/(w1 + w2 + \ldots + wn) \text{ where } (w1 + w2 + \ldots + wn) = 1$$

The first averaged measurement output should occur after N measurement sample periods. Subsequent averaged measurement outputs will follow in each sample period. Samples of STA-related data should be reset after a STA moves.

Default measurement settings are provided in Table 3.

TABLE 3

Default Measurement Settings

| Parameters | Settings |
| --- | --- |
| A1 is the number of samples to average (moving average window size) | Configurable with default = 5 |
| A2 is sample interval | Configurable with default = 2 s Note this assumes a simple set of data is polled for at this interval (defined in Section 4) |
| Averaging weights | Configurable weights with (w1 + w2 + . . . + wn) = 1 |

Raw sample measurements are collected and averaged with their prior samples at every sample period. Periodic sample measurement collection and averaging applies to the chosen STA link quality metric (configuration setting) for each associated STA and to the channel utilization for each AP radio. Averaged measurements are then utilized to determine a steering event.

When required, averaged link measurements and channel utilization measurements are compared with their respective link metric and channel utilization trigger thresholds (configurable settings) to detect a steering event. Only one event type (i.e. link quality or channel utilization) can be processed at a time, so the highest priority event (configurable setting) is processed first with the determination if a target STA for steering can be found.

If no target STA for steering is found, then the next priority event is processed with determination if a target STA for steering can be found. There is considerable logic in the STA list selection, described later in the specification, but it should at this point be noted that this logic accounts for what ESS the STA is associated with. In theory, multiple ESS with steering can exist concurrently. ESS steering support and priority are configurable settings. Steering should typically only apply to Data ESS in Phase 1 Event checking should only proceed if a prior target-STA's steer has completed. Event checking should be skipped otherwise.

A prior target STA steer is complete when the AP detects that the steer has succeeded or that the target STA has failed to steer. A failure to steer is based on a steer timeout period defined in the steering execution logic elsewhere in this disclosure.

Figure 18A:
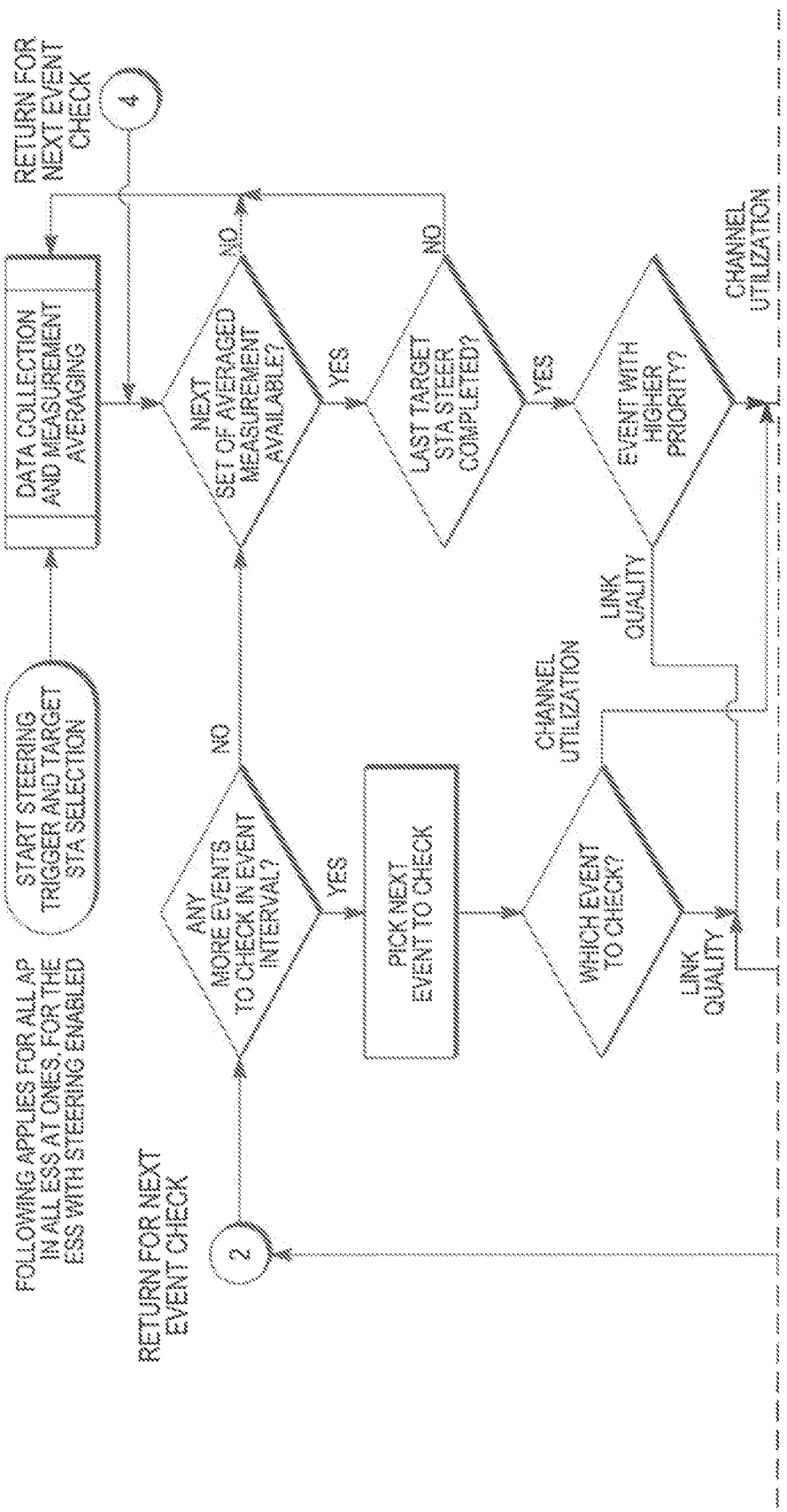
FIGS. 18A and 18B show trigger event detection and target STA listing logic
Figure 18B:
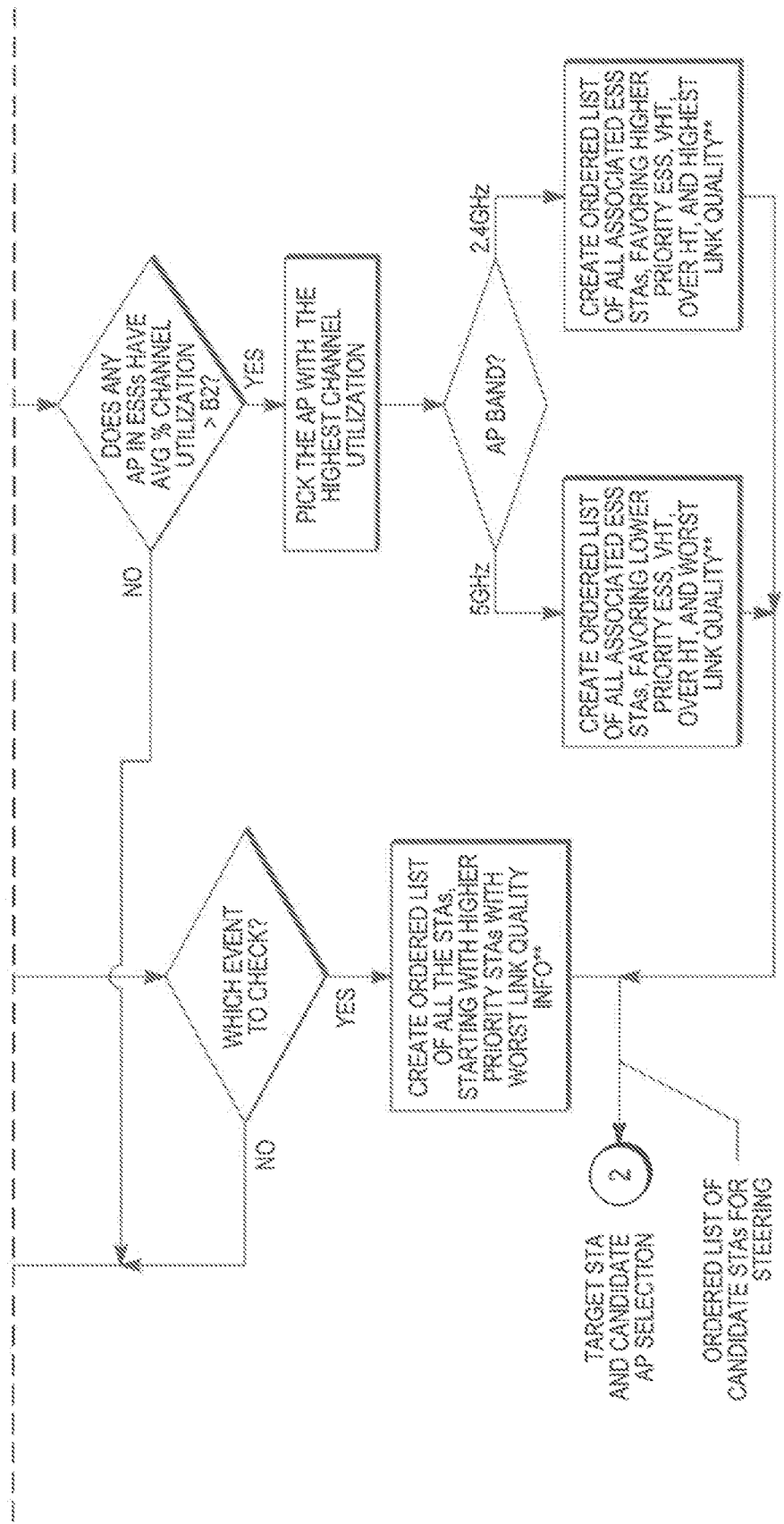

Trigger event detection and target STA listing logic is shown in FIGS. 18A and 18B, which default threshold settings shown in Table 4, below.

TABLE 4

Default Steering Trigger Settings

| Parameters | Settings |
| --- | --- |
| B1 is the STA link quality threshold below which a trigger occurs Only one link quality metric choice is allowed, however multiple default settings may still be provided | Tx PHY rate with default = 30 Mbps RSSI (received at RG) with default = −68 dBm |
| B2 is the AP radio's channel utilization threshold above which steering should be considered Separate thresholds are needed for 2.4 GHz and 5 GHz | Percent utilization includes airtime utilization from the AP radio and its neighboring radio's that share media access to the channel (OBSS interference) Default = 75% for 2.4 GHz and 65% for 5 GHz. |

If made available by WiFi chipset vendors, the STA MCS would be the most useful metric. An example default threshold could be 4, below which a steering trigger should occur.

As shown FIGS. 18A and 18B, an initial target STA listing is created with target STA candidates depending on the event. For a link quality trigger event, the logic creates an ordered list of any STAs that have a link quality trigger (for configured link quality metric), starting with STA with worst link quality info. Preferably, link quality threshold checks should not be conducted for any STA listed as steering unfriendly or steering restricted. For channel utilization trigger events, if on a 5 GHz AP, the procedure create an ordered list of associated STAs, favoring lower priority ESS association, HT over VHT, and worst link quality and if on 2.4 GHz APs, the procedure creates an ordered list of associated STAs, favoring higher priority ESS association, VHT over HT, and highest link quality. Preferably, the procedure excludes STAs that are configured to avoid being steered. Preferably, a channel utilization event should never result in moving the only associated STA. Additionally, for link quality or channel utilization trigger events, it is preferably to determine if an STA should be added to a target STA list according to the conditions shown in FIGS. 19A and 19B. Preferably, candidate AP determination may be used to provide the added screening for the cases noted in these figures.

For STAs with an undetermined band state in the list, the following options may be employed, depending on the configuration of the wireless network:

Option 1(forced steer) Allow STA to be steered to other band. The outcome of this steer is that addressed below Option 2 (not forced steer) Wait STA's dual band status to eventually be determined (if ever) by receiving indication of it signaling in the other band (e.g. from probe request or association at AP in other band)

In the event that a STA with undetermined band status is force steered to another band (Option 1 above), its band status may be determined based on whether the steer succeeds or fails. Note that a forced steer to another band without determined band status can only be determined to not support that band if there are no candidate APs for the target STA other than in the undetermined band. The same applies for steering unfriendly determination.

If the steer succeeds, update STA states, Band support state with both bands, and Dual band capability as yes.

If the steer fails, increase the band failed steer status counter. A BTM steer attempt should be considered a failure if the STA's BTM response status code (defined in Table 9-357 in IEEE 802.11 2016 standard) indicates value of 2 or 3 where Code 2=Insufficient beacon or probe response frames received from all candidates and Code 3=Insufficient available capacity from all candidates. A blacklist steer attempt should be considered a failure if the steer is not completed within the steer timeout period. If an STA is BTM steered, and fails but blacklist is immediately pursued and is successful, the steer should be considered successful. If an STA is BTM steered and fails and blacklist is immediately pursued and it fails, the steer should be considered a failure and the failure count should be incremented by 1.

If the STA's dual-band failed steer counter reaches a configurable max threshold (Nfmax), the STA states should be updated accordingly, setting Band support state without other band and Dual band capability as no, and Steering unfriendly according to failed steer band.

Reception of STA signaling in the other band (e.g. from probes) would also be used to update the STA status accordingly, Setting Band support state with other band and Dual band capability as yes.

Some STAs will be determined to be steering unfriendly, and it can be assumed that the max failed steer max count (Nfsmax) used for determining dual-band support via a forced steer would also apply for determining steering unfriendly status. A consecutive sequence of Nfsmax unsuccessful steering is used to declare a steer unfriendly. If an STA is steered unsuccessfully to 5 GHz (Nfsmax sequential times) it should be marked as being 5G steering unfriendly. This should apply regardless of the STA's Band support state or Dual band capability state. If an STA is steered unsuccessfully to 2.4 GHz (Nsfmax sequential times) it should be marked as being 2G steering unfriendly. This applies regardless of the STA's Band support state or Dual band capability state. Nfsmax is cleared when a successful steer occurs. A failed steer state will clear upon expiration of failed steer time out value (Tfsclear).

Figure 20:
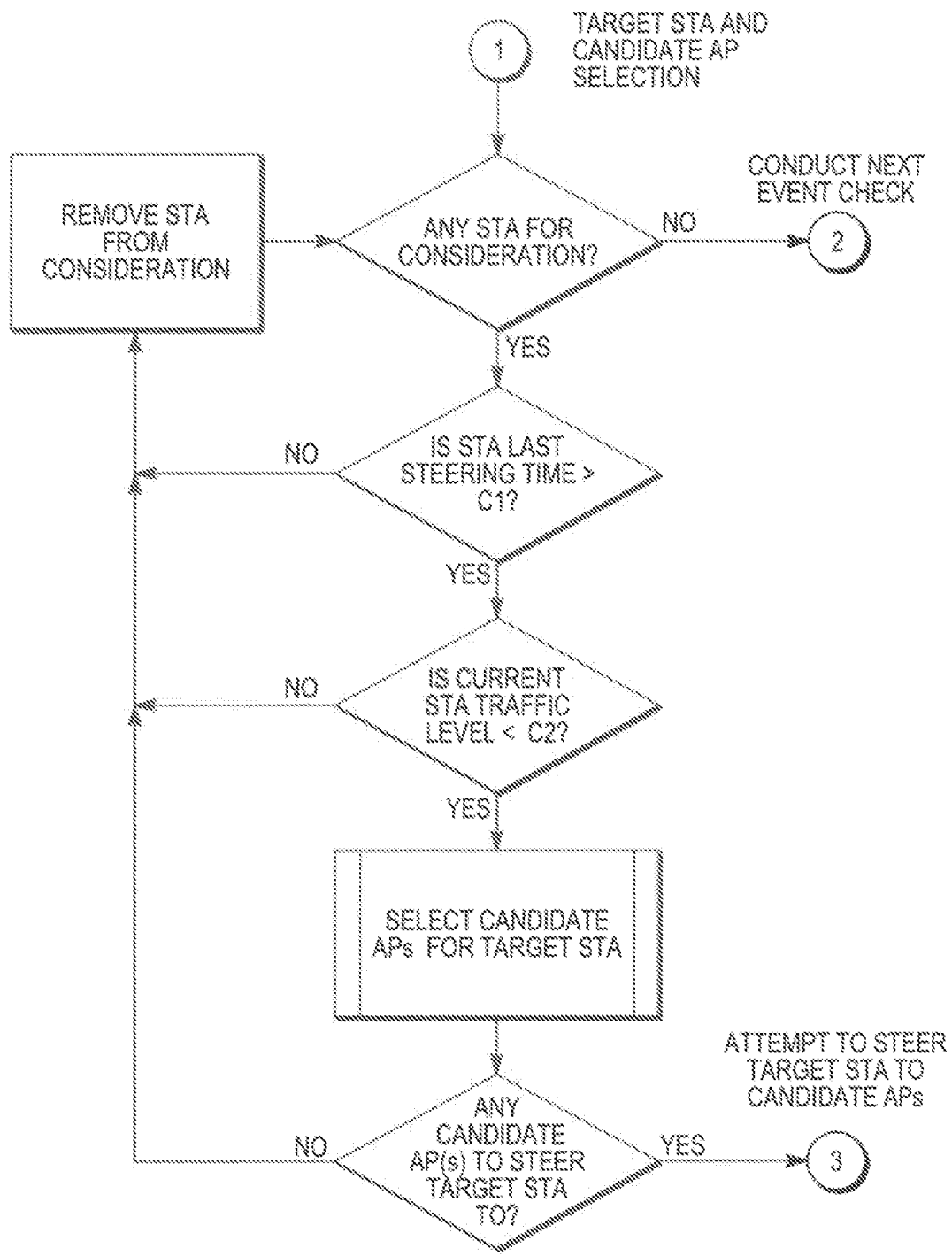
FIG. 20 shows a technique for steering using exemplary screening criteria.

A target STA is selected from the STA listing, starting from the highest STA in the listing and progressing down the list when a prior candidate does not meet the STA screening criteria. A technique for steering using exemplary screening criteria are shown in FIG. 20. As seen for target STA selection, a set of candidate APs to steer the target STA must be determined. If there are any candidate APs to steer the target STA to, a steer attempt will commence. A Phase 1 steering method will use blacklisting/disassociation, or BSS transition management. If there are no candidate AP to steer a target STA to, the next STA in the target STA list must be evaluated to determine if it has candidate AP to steer to. If there are no candidate AP to steer a target STA to, a return for an event check must commence. Table 5 shows default STA selection settings.

TABLE 5

Default STA Selection Settings

| Parameters | Settings |
| --- | --- |
| C1 is minimum allowed delay since last steering occurrence | Default = 15 s |
| C2 is traffic level below which steering is allowed | Default = 100 Kbps |

Figure 21A:
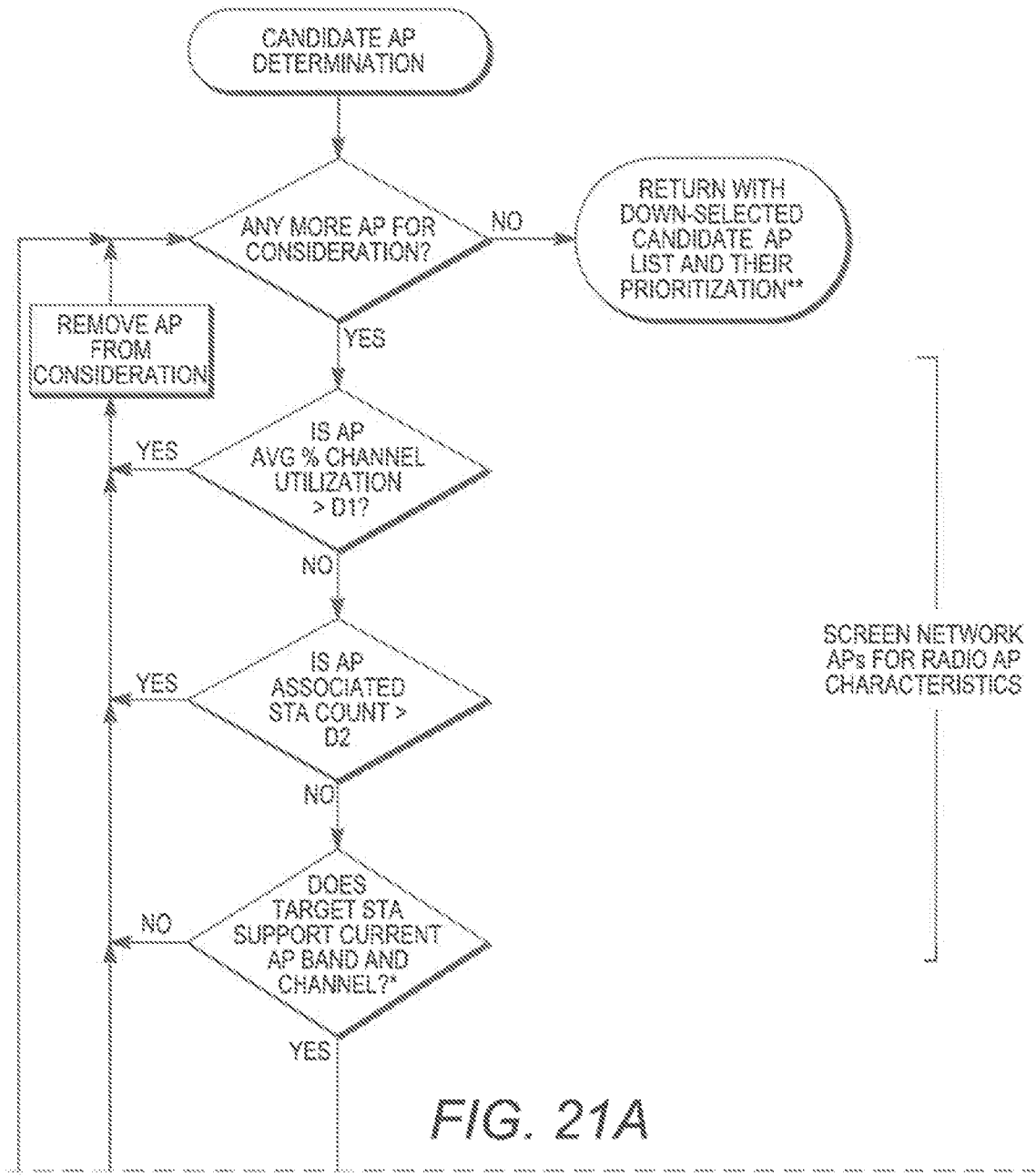
FIGS. 21A and 21B shows screening logic based on available WLAN Radio/AP characteristics and target STA capabilities.
Figure 21B:
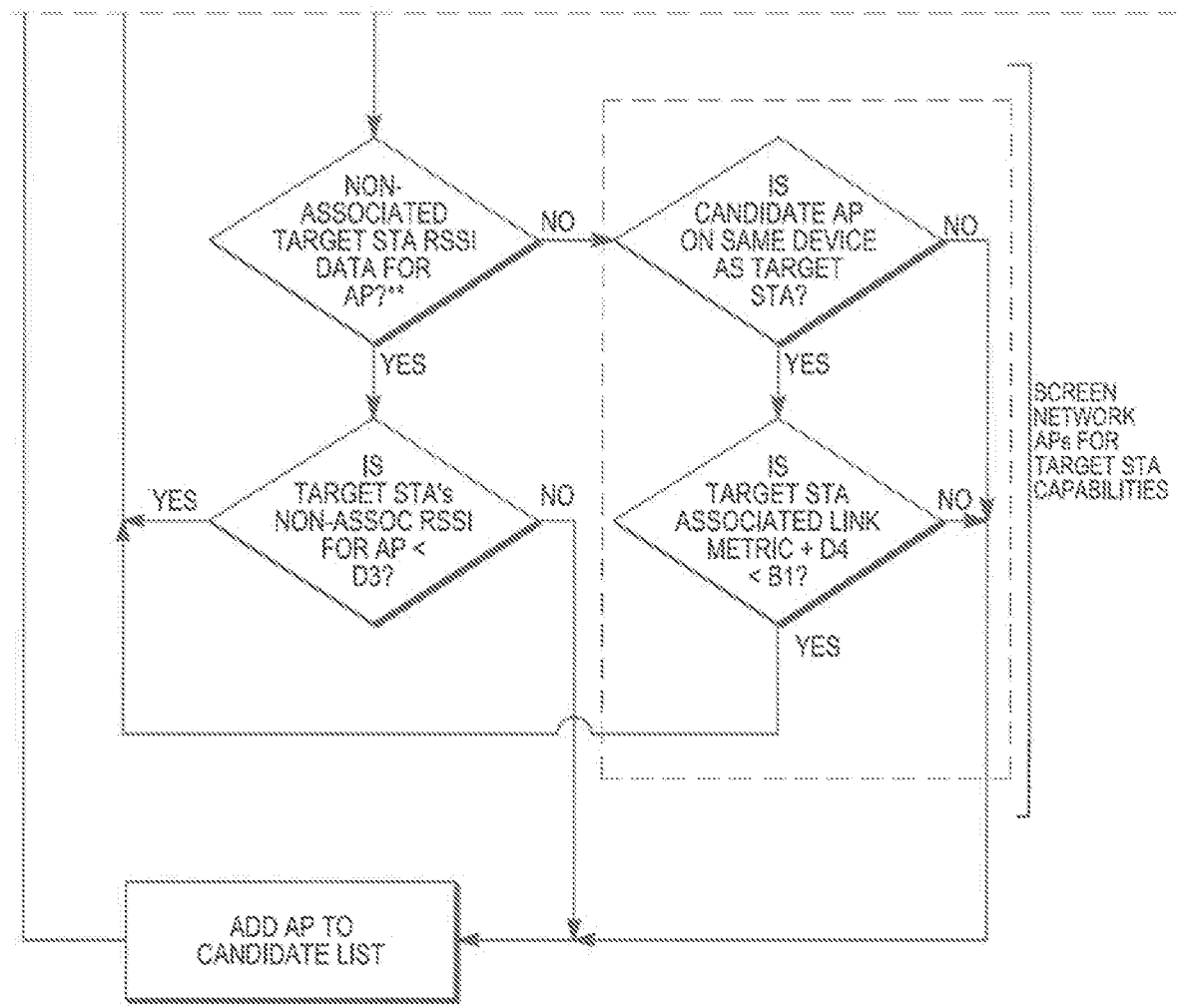

APs are screened out from candidate AP contention based on available WLAN Radio/AP characteristics and target STA capabilities. The screening logic is shown in FIG. 21, with default settings for this logic shown in Table 6.

TABLE 6

Default Candidate AP Settings

| Parameters | Settings |
| --- | --- |
| D1 % AP radio channel utilization threshold below which steering to an AP is allowed | Default = 60% |
| D2 max associated STA count limit per AP above which steering is not allowed | Default count = 10 STA |
| D3 link quality threshold target STA's non-associated AP link quality metric | RSSI with default = −75 dBm Note only RSSI would be available for non-associated link quality |
| D4 link quality adjustment for target STA to AP in same device (placeholder-subject to refinement as noted in figure) | If target STA is associated with 5 GHz band and: other AP band is same D4 = 0 other AP band is 2.4 GHz D4 = 0 Mbps for PHY rate metric or 0 dBm for RSSI metric If target STA is associated with 2.4 GHz band and: other AP band is same D4 = 0 other AP band is 5 GHz D4 = 0 Mbps for PHY rate metric or 0 dBm for RSSI metric |

Network APs are prioritized when BTM steering is required from the list of APs. Baseline logic for implementing prioritization may be used with the following formula(s):

$$AP\ \text{preference} = \text{Min}(\text{Max}(100+(\text{Target STA Non-Associated RSSI from candidate } AP)+x, 1), 255)$$

where RSSI is measured in dBm and x=64 if the target STA is HT and the candidate AP band is 5 GHz, x=−64 if the target STA is VHT and the candidate AP band is 2.4 GHz, and is 0 otherwise. Those of ordinary skill in the art will appreciate that BSS Transition Candidate Preference is a byte value in the candidate AP listing (Neighbor report) with the following definition per IEEE standard: "The Preference field value of a Neighbor Report element used in a BSS Transition Management frame shall be between 1 and 255. The value of 0 is reserved. The values between 1 and 255 provide the indication of order, with 255 indicating the most preferred BSS within the given candidate list, decreasing numbers representing decreasing preference relative only to entries with lower values of the Preference field, and equal numbers representing equal preference."

Figure 22:
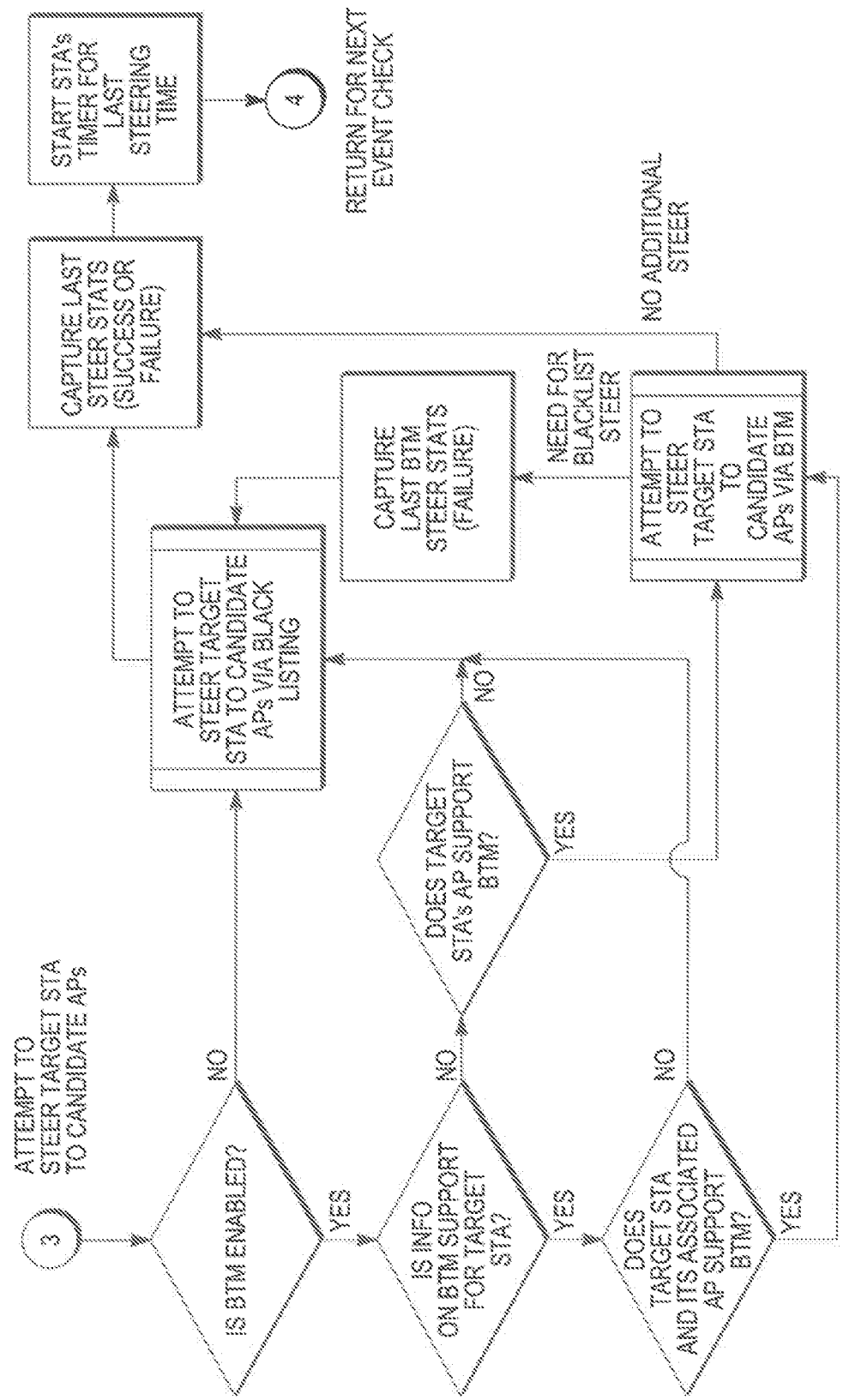
FIG. 22 shows steering execution logic for target STA steering with selective blacklisting/disassociation.
Figure 23:
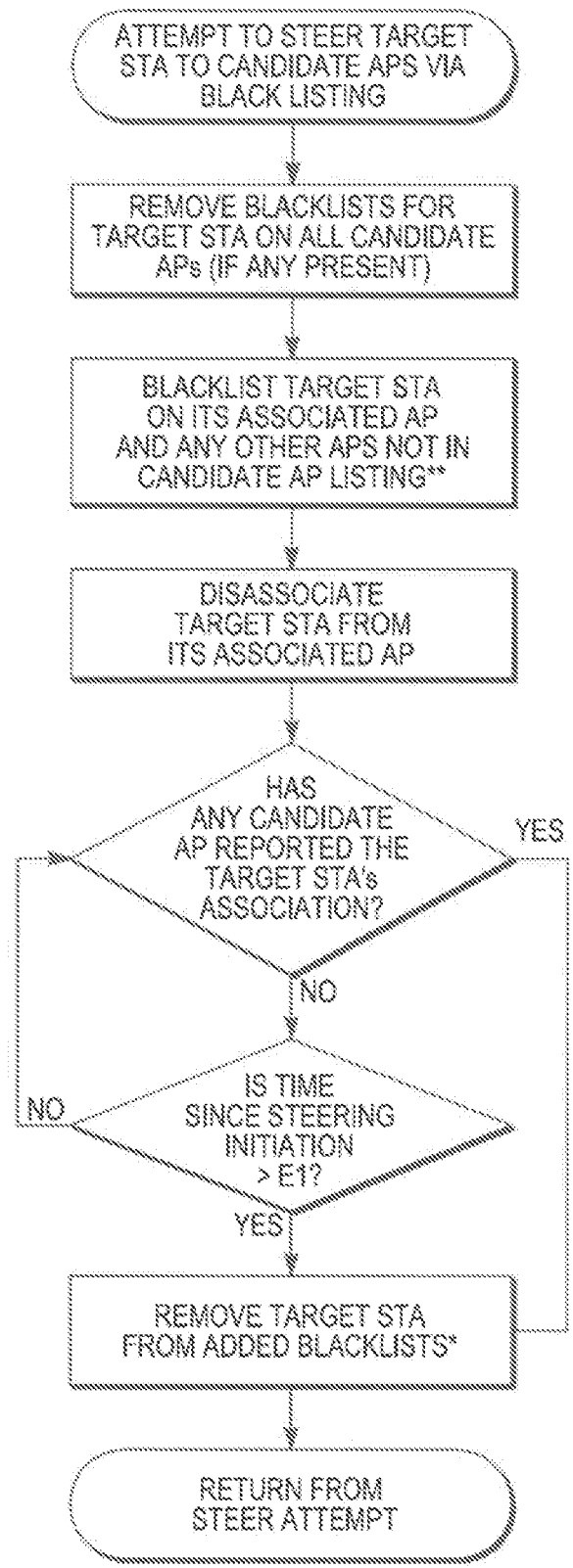
FIG. 23 shows blacklisting execution logic for target STA steering with selective blacklisting/disassociation
Figure 24:
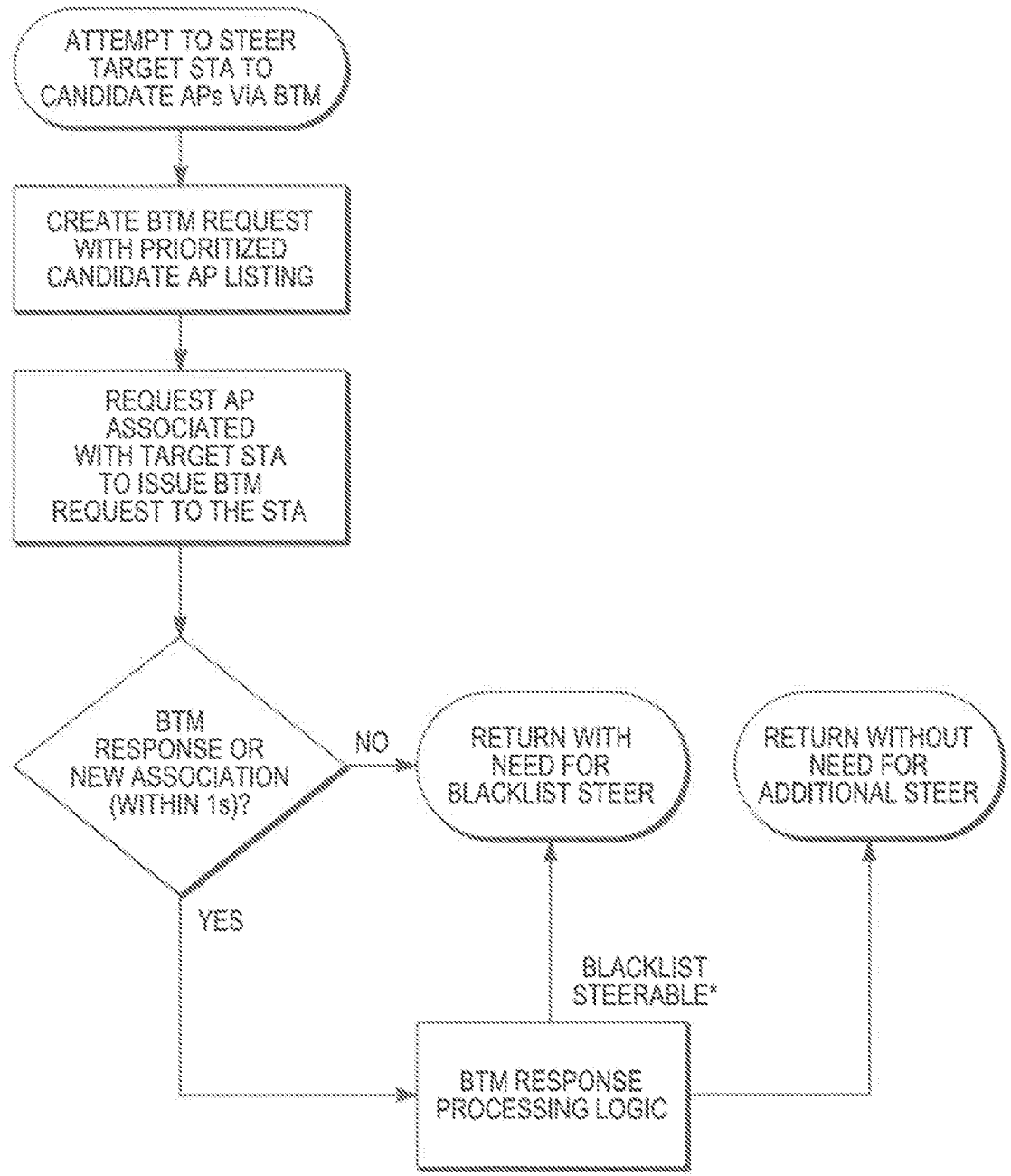
FIG. 24 shows BTM steering execution logic for target STA steering with selective blacklisting/disassociation.

Target STA steering is attempted with blacklisting/disassociation unless specific BTM settings and functionality are available. Steering execution logic is shown in FIG. 22 and blacklist execution is shown in FIG. 23. BTM steering execution is shown in FIG. 24. The BTM request should contain all candidate APs and their priority for the target STA. This may not be possible for chipset vendors that offer BTM support—often they only offer one candidate AP option. In this case use of non-associated client information is imperative to ensure that the one candidate AP provided is known to support the client. At a minimum the RG will note transition failures resulting from STA rejection of an RG BTM request. Default steering execution parameters are shown in Table 7.

TABLE 7

Default Steering Settings

| Parameters | Characteristics |
|---|---|
| E1 is maximum period allowed for blacklisted steering occurrence | Configurable with delay, default = 10 s |

Note that BTM will have beacon transmission time setting (TBTTs) for BTM if Disassociation Timer. Steering stats may be defined in HNC data model extensions, and the steering timer should be reset upon each steering attempt The subject matter of this disclosure, and components thereof, can be realized by software instructions that upon execution cause one or more processing devices to carry out the processes and functions described above. Such instructions can, for example, comprise interpreted instructions, such as script instructions, e.g., JavaScript or ECMAScript instructions, or executable code, SoftAp mode pulse timing activation and deactivation instructions, signal strength activation and deactivation software, initial fingerprint (birth certificate) logarithmic and execution instructions, activation signals or software, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

The present invention may be implemented as any combination of a system, a method, an integrated circuit, and a computer program on a non-transitory computer readable recording medium.

The content streaming apparatuses, gateway devices, and/or the GSM may be in the form of an access point, set-top box or other standalone device, or may be incorporated in a television or other content playing apparatus, or other device and the scope of the present invention is not intended to be limited on such forms.

The components of the content streaming apparatuses, gateway devices, and GSM may be implemented as Integrated Circuits (IC), Application-Specific Integrated Circuits (ASIC), or Large Scale Integrated circuits (LSI), system LSI, super LSI, or ultra LSI components which perform a part or all of the functions of the GSM, and gateway devices. Each of the processing units can be many single-function components, or can be one component integrated using the technologies described above. Components may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The present invention may be a non-transitory computer-readable recording medium having recorded thereon a program embodying the methods/algorithms discussed above for instructing a processor to perform the methods/algorithms.

Each of the elements of the present invention may be configured by implementing dedicated hardware or a software program controlling a processor to perform the functions of any of the components or combinations thereof. Any of the components may be implemented as a CPU or other processor reading and executing a software program from a recording medium such as a hard disk or a semiconductor memory.

It is also contemplated that the implementation of the components of the present invention can be done with any newly arising technology that may replace any of the above implementation technologies.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An electronic device configured to steer a client device from a first content streaming apparatus to a second content streaming apparatus within a Wi-Fi network, based at least on a comparison of measurements from the first and second content streaming apparatuses, respectively, to at least one threshold, the electronic device comprising:
   a memory configured to store a program; and
   a controller configured to execute the program to perform control of wireless steering operations in the Wi-Fi network including:
   to construct a table including an ordered list of a plurality of Wi-Fi content streaming apparatuses in the Wi-Fi network including the first content streaming apparatus and the second content streaming apparatus, the ordered list being based on measured values associated with the plurality of Wi-Fi content streaming apparatuses, the first content streaming apparatus being associated in the table with a first set of measured values and the second content streaming apparatus being associated in the table with a second set of measurement values, and
   to select the second content streaming apparatus as a destination for steering of the client device from remaining content streaming apparatuses in the table that are not disfavored in the table based on the at least one of the first threshold and the second threshold.

2. The electronic device of claim 1, wherein a result of the comparison includes a difference between at least one measurement and a respective one of the at least one threshold.

3. The electronic device of claim 1, wherein the controller is further configured to execute the program so that the client device is steered from the first content streaming apparatus based on comparing a first measurement to a first threshold, and the client device is steered to the second content streaming apparatus based on comparing a second measurement to a second threshold.

4. The electronic device of claim 3, wherein the first threshold is greater than the second threshold.

5. The electronic device of claim 3, wherein the first threshold is greater than the second threshold, and the first and second measurements quantify respective signal strengths associated with the client device.

6. The electronic device of claim 3, wherein the first and second measurements quantify respective capacities of the first and second content streaming apparatuses.

7. The electronic device of claim 1 wherein the measured values are at least one of signal strength values and capacity values.

8. The electronic device of claim 1, wherein the controller is further configured to execute the program to calculate the second set of values using the first set of measured values.

9. A method implemented in an electronic device for steering a client device in a wireless network from a first content streaming apparatus to a second content streaming apparatus within a Wi-Fi network, based at least on a comparison of measurements from the first and second content streaming apparatuses, respectively, to at least one threshold, the method comprising:
   receiving a first measurement and making a first comparison that compares the first measurement to a first threshold while the client device is connected to the first content streaming apparatus;
   receiving a second measurement and making a second comparison that compares the second measurement to a second threshold; and
   steering the client device to the second content streaming apparatus based on at least one of the first comparison and the second comparison,
   wherein, in the steering, the method further comprises:
   constructing a table that includes an ordered list of a plurality of Wi-Fi content streaming apparatuses in the Wi-Fi network including the first content streaming apparatus and the second content streaming apparatus, the ordered list being based on measured values associated with the plurality of Wi-Fi content streaming apparatuses, the first content streaming apparatus being associated in the table with a first set of measured values and the second content streaming apparatus being associated in the table with a second set of measurement values; (No in US '194)
   selecting the second content streaming apparatus as a destination for steering of the client device from remaining content streaming apparatuses in the table that are not disfavored in the table based on the at least one of the first threshold and the second threshold.

10. The method of claim 9, wherein the first threshold is greater than the second threshold, and the first measurement and the second measurement quantify a signal strength associated with the client device.

11. The method of claim 9, wherein the first measurement quantifies a first capacity associated with the first content streaming apparatus, and the second measurement quantifies a second capacity associated with the second content streaming apparatus.

12. The method of claim 9 further comprising the step of calculating the second set of values using the first set of values.

13. The method of claim 9, wherein the measured values are at least one of signal strength values and capacity values.

14. An electronic device configured to control wireless steering operations in a wireless network, comprising:
a memory configured to store a program; and
a controller configured to execute the program to:
steer a selected client device among a plurality of client devices associated with a first content streaming apparatus to a second content streaming apparatus,
wherein the controller selects the client device using a measurement comprising at least one of a signal strength measure and a capacity measure, and
the wireless controller selects the second content streaming apparatus using the other one of the signal strength measure and the capacity measure.

15. The electronic device of claim 14, wherein the content streaming devices are respective access points in at least one of a gateway and a wireless extender.

16. The electronic device of claim 14, wherein the controller is further configured to execute the program to steer the selected client device from on access point in a content streaming apparatus to a second access point in the content streaming apparatus having a different frequency of operation than the first access point.

17. The electronic device of claim 14, wherein the selected client device is selected from a plurality of devices in a table constructed by the controller, the table filtered using at least one of the signal strength measure and the capacity measure.

18. The electronic device of claim 14, wherein the second content streaming apparatus is selected from a plurality of devices in a table constructed by the controller, the table filtered using at least one of the signal strength measure and the capacity measure.

\* \* \* \* \*